US012630671B2

(12) United States Patent
Zou et al.

(10) Patent No.: US 12,630,671 B2
(45) Date of Patent: May 19, 2026

(54) CYCLIC OLEFIN POLYMER, CYCLIC OLEFIN POLYMER MONOMER, AND OPTICAL PRODUCT

(71) Applicant: HUAWEI TECHNOLOGIES CO., LTD., Shenzhen (CN)

(72) Inventors: Hailiang Zou, Dongguan (CN); Chen Chen, Shenzhen (CN); Huihui Zhou, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 502 days.

(21) Appl. No.: 18/140,216

(22) Filed: Apr. 27, 2023

(65) Prior Publication Data

US 2023/0287169 A1 Sep. 14, 2023

Related U.S. Application Data

(63) Continuation of application No. PCT/CN2021/107058, filed on Jul. 19, 2021.

(30) Foreign Application Priority Data

Oct. 28, 2020 (CN) ......................... 202011175631.9

(51) Int. Cl.
*C08G 61/08* (2006.01)

(52) U.S. Cl.
CPC .......... *C08G 61/08* (2013.01); *C08G 2261/11* (2013.01); *C08G 2261/3325* (2013.01); *C08G 2261/418* (2013.01); *C08G 2261/724* (2013.01)

(58) Field of Classification Search
None
See application file for complete search history.

(56) References Cited

U.S. PATENT DOCUMENTS 6,677,419 B1 1/2004 Brock et al.
6,762,265 B1 7/2004 Jacobs-Hattwig et al.

(Continued)

FOREIGN PATENT DOCUMENTS

CN 1151715 A 6/1997
CN 103159914 A 6/2013

(Continued)

OTHER PUBLICATIONS

Agha, et al.," A Review of Cyclic Olefin Copolymer Applications in Microfluidics and Microdevices", Macromolecular Materials and Engineering, 307, 2200053, 2022. (Year: 2022).*

(Continued)

*Primary Examiner* — Christopher M Rodd
(74) *Attorney, Agent, or Firm* — WOMBLE BOND DICKINSON (US) LLP

(57) ABSTRACT

A cyclic olefin polymer, a cyclic olefin polymer monomer, and an optical product using the foregoing cyclic olefin polymer are provided.

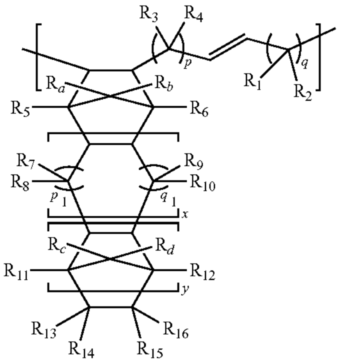

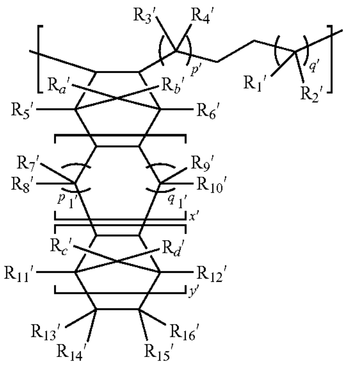

The cyclic olefin polymer includes a repeat unit shown in Formula (1) and/or a repeat unit shown in Formula (2). In Formula (1), $0 \leq p$, and $q \leq 6$; $x \geq 0$, and $y \geq 0$; $0 \leq p_1$, $q_1 \leq 6$, and $p_1$ and $q_1$ are not 0 at the same time; $R_1$ to $R_{12}$, $R_a$, $R_b$, $R_c$, $R_d$, $R_{13}$, $R_{14}$, $R_{15}$, and $R_{16}$ are separately and independently selected from a hydrogen atom, a halogen atom, an alkyl group, an aryl group, an alkoxy group, a hydroxy group, an ester group, a cyano group, an amino group, a thiol group, and an atom or an atomic group that can replace the foregoing group; and any two, three, or four of $R_{13}$, $R_{14}$, $R_{15}$, and $R_{16}$ may be connected to form a cyclic structure.

20 Claims, No Drawings

(56) References Cited

U.S. PATENT DOCUMENTS

| | | | | |
|---|---|---|---|---|
| 7,084,314 | B1 | 8/2006 | French et al. | |
| 9,958,228 | B2 | 5/2018 | Stewart et al. | |
| 2002/0031622 | A1* | 3/2002 | Ippel | G06F 3/045 428/1.6 |
| 2006/0281028 | A1 | 12/2006 | Peng et al. | |

FOREIGN PATENT DOCUMENTS

| | | | | | |
|---|---|---|---|---|---|
| CN | 111777702 | A | | 10/2020 | |
| JP | S63218726 | A | | 9/1988 | |
| JP | H02101024 | A | | 4/1990 | |
| JP | H07196779 | A | * | 8/1995 | |
| JP | H1042517 | A | | 2/1998 | |
| JP | H10240517 | A | | 9/1998 | |
| JP | H1132626 | A | | 2/1999 | |
| JP | 2000010221 | A | | 1/2000 | |
| JP | 2005162617 | A | | 6/2005 | |
| JP | 2005162618 | A | | 6/2005 | |
| JP | 2005213370 | A | | 8/2005 | |
| JP | 2007001967 | A | | 1/2007 | |
| JP | 2007106932 | A | | 4/2007 | |
| JP | 2015199939 | A | | 11/2015 | |
| JP | 2020105333 | A | * | 7/2020 | |
| KR | 20140004276 | A | * | 1/2014 | C08F 32/00 |
| WO | 03007805 | A2 | | 1/2003 | |
| WO | 2004033525 | A1 | | 4/2004 | |
| WO | WO-2017223276 | A1 | * | 12/2017 | C09D 11/30 |

OTHER PUBLICATIONS

JPH07196779 English machine translation, prepared Oct. 15, 2025. (Year: 2025).*

Christopher W. Bielawski et al.:“Living ring-opening metathesis polymerization.” Oct. 10, 2006. total 29 pages.

Incoronata Tritto et al:“Metallocene catalyzed ethene- and propene co-norbornene polymerization: Mechanisms from a detailed microstructural analysis.” Sep. 2, 2005. total 30 pages.

Xiaofang Li et al:“Organometallic catalysts for copolymerization of cyclic olefins.” Dec. 3, 2007. total 29 pages.

Seung Tack Yu et al:“Preparation of a Bulky Cycloolefin/Ethylene Copolymer and Its Tensile Properties.” Macromolecules 2010, 43, 725-730 725. Nov. 24, 2009. total 6 pages.

Ji-Jun Zou et al:“Preparation of Pd-B/-Al2O3 amorphous catalyst for the hydrogenation of tricyclopentadiene.” Mar. 6, 2007. total 7 pages.

Sutthira Sutthasupa et al:“Recent advances in ring-opening metathesis polymerization, and application to synthesis of functional materials.” Oct. 13, 2010. total 11 pages.

Michael A. Tallon:“Ring-Opening Metathesis Polymerization (ROMP) Using Maleic Anhydride-Based Monomers.” Sep. 23, 2016. total 88 pages.

Ushakov, N.V. Selective Hydrogenation of Dicyclopentadiene. Russ J Appl Chem 93, 159-166 (2020). https://doi.org/10.1134/S1070427220020019. May 6, 2020. total 8 pages.

Iosub Andrei V. , Stahl Shannon S.: “Palladium-Catalyzed Aerobic Oxidative Dehydrogenation of Cyclohexenes to Substituted Arene Derivatives”, Journal of the American Chemical Society, vol. 137, No. 10, Mar. 18, 2015, p. 3454-3457, XP055927162.

Nibbering, N.M.M. van der Hart, W.J.: “A computational study of the double hydrogen migration in the molecular ions of endo tricyclo[5.2.1.0^2^, ^6]decene”, Journal of the American society for mass spectrometry, Elsevier science Inc, US, vol. 13, No. 10, Oct. 1, 2002, p. 1186-1189, XP004383141.

The synthesis of cyclic olefin copolymers (COCs) by ethylene copolymerisations with cyclooctene, cycloheptene, and 1 with tricyclo[6.2.1.0(2,7)]undeca-4-ene: the effects of cyclic monomer structures on thermal properties, Polymer Chemistry, Aug. 21, 2020, vol. 11, Issue 35, pp. 5590-5600.

* cited by examiner

CYCLIC OLEFIN POLYMER, CYCLIC OLEFIN POLYMER MONOMER, AND OPTICAL PRODUCT

CROSS-REFERENCE TO RELATED APPLICATIONS

This application is a continuation of International Application No. PCT/CN2021/107058, filed on Jul. 19, 2021, which claims priority to Chinese Patent Application No. 202011175631.9, filed Oct. 28, 2020. The disclosures of the aforementioned applications are hereby incorporated by reference in their entireties.

TECHNICAL FIELD

Embodiments of this application relate to the field of cyclic olefin polymer technologies, and in particular, to a cyclic olefin polymer, a cyclic olefin polymer monomer, and an optical product.

BACKGROUND

A cyclic olefin polymer is a thermoplastic resin material with excellent optical properties, and is widely used in electronic products and fields such as packaging. There are mainly two types of cyclic olefin polymer materials. One type is a cyclic olefin copolymer (COC) that is a polymer product obtained after addition polymerization (VAP) is performed on a plurality of olefin monomers such as cyclic olefin and α-olefin (mono-olefin whose double bond is at an end part of a molecular chain). For example, as shown in a chemical equation (1), the COC is obtained by synthesizing norbornene and ethylene through VAP. The other type is a cyclic olefin polymer (COP) that is a polymer product obtained through hydrogenation after ring-opening metathesis polymerization (ROMP) performed on a single cyclic olefin monomer. For example, as shown in a chemical equation (2), the COP is synthesized through ROMP-hydrogenation performed on norbornene.

Chemical equation (1)

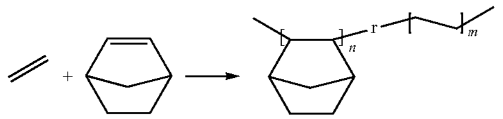

Chemical equation (2)

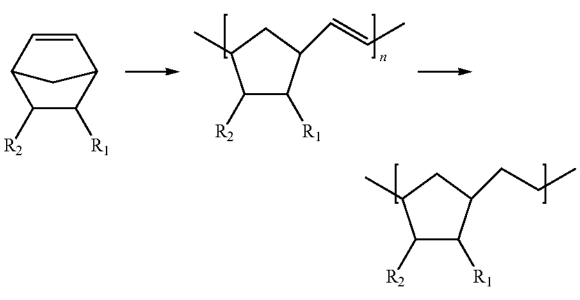

The cyclic olefin polymer includes both a rigid cyclic structure and a flexible aliphatic group chain segment. Based on the aliphatic group chain segment, the cyclic olefin polymer material can have features such as excellent chemical resistance, excellent water resistance, a good mechanical strength, and good electrical insulation. In addition, based on the rigid cyclic structure, the cyclic olefin polymer material can have a high glass transition temperature (Tg). In this way, heat resistance is improved, and crystallization of polyethylene is destroyed, to obtain excellent optical properties. It can be learned from the chemical equation that the COC can obtain good mechanical properties through adjusting relative content of two monomers: norbornene and ethylene, so that relative content of cyclic olefin and α-olefin can be controlled. However, in a polymerization process, homopolymerization of a plurality of ethylene monomers inevitably causes stacking of ethylene chains. Due to the stacking, a polyethylene crystallization region is generated in the polymer. Consequently, optical properties including a haze and a birefringence ratio are reduced. In a process of synthesizing the COP, a cyclic structure of norbornene is destroyed to form a structure of a five-membered ring structure and an ethylene chain segment that are alternatingly arranged according to (1:1), to implement sequence distribution of cyclic olefin and α-olefin. Stacking of ethylene chain segments does not occur in this structure. In this way, good optical properties can be obtained. However, a mole ratio of a cyclic structure monomer in the COP is 50%, and a proportion of a rigid group is high. In this case, the material has a high internal stress after injection molding, mechanical properties are affected, and a rigid-flexible ratio is fixed and unadjustable.

In the foregoing method for synthesizing a cyclic olefin polymer, sequence distribution and relative content of the cyclic olefin and the α-olefin (that is, the rigid cyclic structure and the flexible aliphatic group chain segment) in the polymer cannot be controlled at the same time. Therefore, it is difficult to optimize the mechanical properties and the optical properties of the cyclic olefin polymer at the same time. This limits application of the cyclic olefin polymer in electronic products.

SUMMARY

In view of this, embodiments of this application provide a cyclic olefin polymer, to control both sequence distribution and relative content of a rigid cyclic structure and a flexible aliphatic group chain segment in the polymer. Therefore, the cyclic olefin polymer has both excellent mechanical properties and excellent optical properties.

For example, according to a first aspect, an embodiment of this application provides a cyclic olefin polymer. The cyclic olefin polymer includes a repeat unit whose structural formula is shown in Formula (1) and/or a repeat unit whose structural formula is shown in Formula (2):

Formula (1)

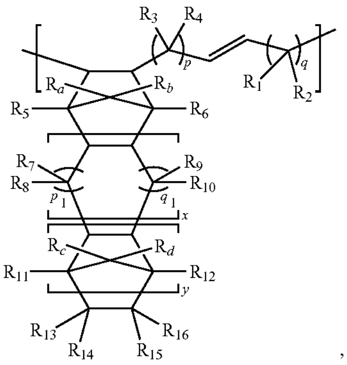

, and

-continued

Formula (2)

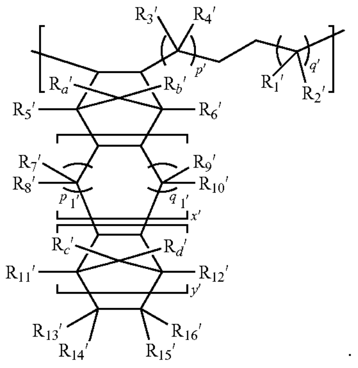

In Formula (1), p and q are integers greater than or equal to 0 and less than or equal to 6; x and y are integers greater than or equal to 0; $p_1$ and $q_1$ are integers greater than or equal to 0 and less than or equal to 6, and $p_1$ and $q_1$ are not 0 at the same time; $R_1$ to $R_{12}$, $R_a$, $R_b$, $R_c$, and $R_d$ are separately and independently selected from a hydrogen atom, a halogen atom, an alkyl group, an aryl group, an alkoxy group, a hydroxy group, an ester group, a cyano group, an amino group, a thiol group, and an atom or an atomic group that can replace the foregoing group; and $R_{13}$, $R_{14}$, $R_{15}$, and $R_{16}$ are separately and independently selected from a hydrogen atom, a halogen atom, an alkyl group, an aryl group, an alkoxy group, a hydroxy group, an ester group, a cyano group, an amino group, a thiol group, and an atom or an atomic group that can replace the foregoing group; or any two, three, or four of $R_{13}$, $R_{14}$, $R_{15}$, and $R_{16}$ are connected to form a cyclic structure, and a group that does not participate in forming the cyclic structure in $R_{13}$, $R_{14}$, $R_{15}$, and $R_{16}$ is separately and independently selected from a hydrogen atom, a halogen atom, an alkyl group, an aryl group, an alkoxy group, a hydroxy group, an ester group, a cyano group, an amino group, a thiol group, and an atom or an atomic group that can replace the foregoing group.

In Formula (2), p' and q' are integers greater than or equal to 0 and less than or equal to 6; x' and y' are integers greater than or equal to 0; $p_1$' and $q_1$' are integers greater than or equal to 0 and less than or equal to 6, and $p_1$' and $q_1$' are not 0 at the same time; $R_1$' to $R_{12}$', $R_a$', $R_b$', $R_c$', and $R_d$' are separately and independently selected from a hydrogen atom, a halogen atom, an alkyl group, an aryl group, an alkoxy group, a hydroxy group, an ester group, a cyano group, an amino group, a thiol group, and an atom or an atomic group that can replace the foregoing group; and $R_{13}$', $R_{14}$', $R_{15}$', and $R_{16}$' are separately and independently selected from a hydrogen atom, a halogen atom, an alkyl group, an aryl group, an alkoxy group, a hydroxy group, an ester group, a cyano group, an amino group, a thiol group, and an atom or an atomic group that can replace the foregoing group; or any two, three, or four of $R_{13}$', $R_{14}$', $R_{15}$', and $R_{16}$' are connected to form a cyclic structure, and a group that does not participate in forming the cyclic structure in $R_{13}$', $R_{14}$', $R_{15}$', and $R_{16}$' is separately and independently selected from a hydrogen atom, a halogen atom, an alkyl group, an aryl group, an alkoxy group, a hydroxy group, an ester group, a cyano group, an amino group, a thiol group, and an atom or an atomic group that can replace the foregoing group.

According to the cyclic olefin polymer provided in an embodiment of the application, a molecular structure of the cyclic olefin polymer includes both a flexible aliphatic group chain segment and a rigid bicyclic structure. Based on the aliphatic group chain segment, an internal stress and a glass transition temperature ($T_g$) of a material can be effectively reduced, and the cyclic olefin polymer has features such as a good mechanical strength, good electrical insulation, excellent chemical resistance, and excellent water resistance. Based on the bicyclic structure, rigidity, thermal resistance, and a glass transition temperature of the cyclic olefin polymer can be improved, and crystallization of the aliphatic group chain segment can be destroyed, so that the cyclic olefin polymer obtains excellent optical properties. For the cyclic olefin polymer provided in an embodiment of the application, sequence distribution and relative content of the bicyclic structure and the aliphatic group chain segment in the molecular structure are both controllable. Therefore, the cyclic olefin polymer has both excellent mechanical properties and excellent optical properties, and further has good processability.

In an embodiment of the application, in the cyclic olefin polymer, a total mass percent of the repeat unit whose structural formula is shown in Formula (1) and the repeat unit whose structural formula is shown in Formula (2) is greater than or equal to 50%. A greater total mass percent of the repeat unit in Formula (1) and the repeat unit in Formula (2) indicates higher optical properties of the cyclic olefin polymer.

In an embodiment of the application, the cyclic olefin polymer further includes a repeat unit whose structural formula is shown in Formula (3):

Formula (3)

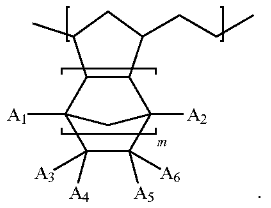

In Formula (3), m is an integer greater than or equal to 0 and less than or equal to 10, and $A_1$ and $A_2$ are separately and independently selected from a hydrogen atom, a halogen atom, an alkyl group, an aryl group, an alkoxy group, a hydroxy group, an ester group, a cyano group, an amino group, a thiol group, and an atom or an atomic group that can replace the foregoing group; and $A_3$, $A_4$, $A_5$, and $A_6$ are separately and independently selected from a hydrogen atom, a halogen atom, an alkyl group, an aryl group, an alkoxy group, a hydroxy group, an ester group, a cyano group, an amino group, a thiol group, and an atom or an atomic group that can replace the foregoing group; or any two, three, or four of $A_3$, $A_4$, $A_5$, and $A_6$ are connected to form a cyclic structure, and a group that does not participate in forming the cyclic structure in $A_3$, $A_4$, $A_5$, and $A_6$ is separately and independently selected from a hydrogen atom, a halogen atom, an alkyl group, an aryl group, an alkoxy group, a hydroxy group, an ester group, a cyano group, an amino group, a thiol group, and an atom or an atomic group that can replace the foregoing group. It is easy to obtain a monomer of the repeat unit shown in Formula (3). The costs of the cyclic olefin polymer can be reduced by using the simple commercial monomer. In addition, rigidity of the material can be improved to some extent, to reconcile mechanical properties.

In an embodiment of the application, in the cyclic olefin polymer, a mass percent of the repeat unit whose structural formula is shown in Formula (3) is less than or equal to 50%.

In an embodiment of the application, a weight average molecular weight of the cyclic olefin polymer is 10000 to 200000. The molecular weight is properly controlled to better balance the mechanical properties and molding properties of the polymer.

In an embodiment of this application, a refractive index of the cyclic olefin polymer is 1.53 to 1.58. The cyclic olefin polymer has a high refractive index. A lens thickness of an optical lens can be reduced when the optical lens is made of the cyclic olefin polymer.

In an embodiment of this application, an Abbe number of the cyclic olefin polymer is greater than or equal to 53. The cyclic olefin polymer has a proper Abbe number, so that a dispersion phenomenon of the material can be controlled to a low level.

In an embodiment of this application, a haze of the cyclic olefin polymer is less than 0.2%. Based on a small haze, visual effect of an optical lens can be improved when the optical lens is made of the cyclic olefin polymer.

In an embodiment of this application, a visible light transmittance of the cyclic olefin polymer is greater than or equal to 90%.

In an embodiment of this application, a glass transition temperature of the cyclic olefin polymer is greater than 100° C. The cyclic olefin polymer has a proper glass transition temperature, to improve molding properties and processability of the cyclic olefin polymer material.

In an embodiment of this application, for the cyclic olefin polymer, a tensile strength is greater than or equal to 30 MPa, an elongation at break is greater than or equal to 6%, and a flexural modulus is greater than 2000 MPa.

In an embodiment of this application, a flexural strength of the cyclic olefin polymer is greater than or equal to 40 MPa.

The cyclic olefin polymer provided in an embodiment of the application has excellent mechanical properties. When an optical lens is made of the cyclic olefin polymer, the optical lens can better resist an external force, so that a service life of the optical lens can be prolonged.

According to a second aspect, an embodiment of this application provides a cyclic olefin polymer monomer. A chemical structural formula of the cyclic olefin polymer monomer is shown in Formula (4):

Formula (4)

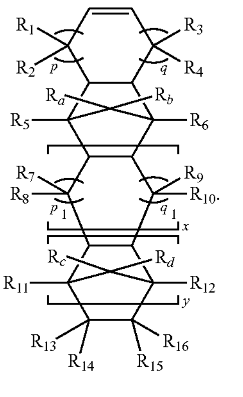

In Formula (4), p and q are integers greater than or equal to 0 and less than or equal to 6; x and y are integers greater than or equal to 0; $p_1$ and $q_1$ are integers greater than or equal to 0 and less than or equal to 6, and $p_1$ and $q_1$ are not 0 at the same time; $R_1$ to $R_{12}$, $R_a$, $R_b$, $R_c$, and $R_d$ are separately and independently selected from a hydrogen atom, a halogen atom, an alkyl group, an aryl group, an alkoxy group, a hydroxy group, an ester group, a cyano group, an amino group, a thiol group, and an atom or an atomic group that can replace the foregoing group; and $R_{13}$, $R_{14}$, $R_{15}$, and $R_{16}$ are separately and independently selected from a hydrogen atom, a halogen atom, an alkyl group, an aryl group, an alkoxy group, a hydroxy group, an ester group, a cyano group, an amino group, a thiol group, and an atom or an atomic group that can replace the foregoing group; or any two, three, or four of $R_{13}$, $R_{14}$, $R_{15}$, and $R_{16}$ are connected to form a cyclic structure, and a group that does not participate in forming the cyclic structure in $R_{13}$, $R_{14}$, $R_{15}$, and $R_{16}$ is separately and independently selected from a hydrogen atom, a halogen atom, an alkyl group, an aryl group, an alkoxy group, a hydroxy group, an ester group, a cyano group, an amino group, a thiol group, and an atom or an atomic group that can replace the foregoing group.

The cyclic olefin polymer monomer provided in an embodiment of the application includes both a saturated bicyclic structure and an unsaturated lipid cyclic structure. The cyclic olefin polymer according to the first aspect of embodiments of this application may be obtained through a ROMP process or a ROMP-hydrogenation process performed on the cyclic olefin polymer monomer. The cyclic olefin polymer is prepared through the ROMP process or the ROMP-hydrogenation process performed on the cyclic olefin polymer monomer, to ensure excellent optical properties and implement adjustability of mechanical properties. Details are as follows: (1) The cyclic olefin polymer obtained through polymerization includes both a flexible aliphatic group chain segment and a rigid bicyclic structure chain segment, to reduce birefringence. (2) Relative content of the rigid bicyclic structure can be controlled, so that rigidity and flexibility, mechanical properties, and processability of the cyclic olefin polymer can be controlled. (3) An alternating sequence of the rigid bicyclic structure and the flexible aliphatic group chain segment can be controlled, to reduce or avoid stacking of the aliphatic group chain segment and reduce microcrystallization. In this way, good optical properties can be obtained.

According to a third aspect, an embodiment of this application provides an optical material, including the cyclic olefin polymer according to the first aspect of embodiments of this application.

In an embodiment of this application, the optical material further includes an additive, and the additive includes one or more of an antioxidant, a plasticizer, a heat stabilizer, and an anti-aging agent.

In an embodiment of this application, in the optical material, a mass percent of the cyclic olefin polymer is greater than or equal to 60%.

According to a fourth aspect, an embodiment of this application provides an optical product. The optical product includes the cyclic olefin polymer according to the first aspect of embodiments of this application, or includes the optical material according to the third aspect of embodiments of this application.

In an embodiment of this application, the optical product includes an optical lens, an optical film, an optical disc, a light guide plate, or a display panel.

In an embodiment of this application, the optical lens includes an eyeglass lens, a camera lens, a sensor lens, an illumination lens, and an imaging lens.

An embodiment of this application further provides a device, including the optical product according to the fourth aspect of embodiments of this application.

DESCRIPTION OF EMBODIMENTS

The following describes the technical solutions in embodiments of this application.

An embodiment of this application provides a cyclic olefin polymer. The cyclic olefin polymer includes a repeat unit whose structural formula is shown in Formula (1) and/or a repeat unit whose structural formula is shown in Formula (2):

Formula (1)

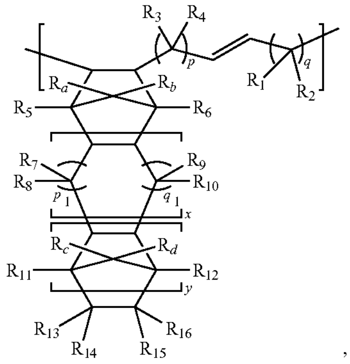

, and

Formula (2)

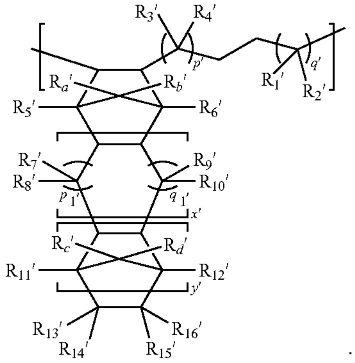

.

In Formula (1), p and q are integers greater than or equal to 0 and less than or equal to 6; x and y are integers greater than or equal to 0; $p_1$ and $q_1$ are integers greater than or equal to 0 and less than or equal to 6, and $p_1$ and $q_1$ are not 0 at the same time; $R_1$ to $R_{12}$, $R_a$, $R_b$, $R_c$, and $R_d$ are separately and independently selected from a hydrogen atom, a halogen atom, an alkyl group, an aryl group, an alkoxy group, a hydroxy group, an ester group, a cyano group, an amino group, a thiol group, and an atom or an atomic group that can replace the foregoing group; and $R_{13}$, $R_{14}$, $R_{15}$, and $R_{16}$ are separately and independently selected from a hydrogen atom, a halogen atom, an alkyl group, an aryl group, an alkoxy group, a hydroxy group, an ester group, a cyano group, an amino group, a thiol group, and an atom or an atomic group that can replace the foregoing group; or any two, three, or four of $R_{13}$, $R_{14}$, $R_{15}$, and $R_{16}$ are connected to form a cyclic structure, and a group that does not participate in forming the cyclic structure in $R_{13}$, $R_{14}$, $R_{15}$, and $R_{16}$ is separately and independently selected from a hydrogen atom, a halogen atom, an alkyl group, an aryl group, an alkoxy group, a hydroxy group, an ester group, a cyano group, an amino group, a thiol group, and an atom or an atomic group that can replace the foregoing group.

In Formula (2), p' and q' are integers greater than or equal to 0 and less than or equal to 6; x' and y' are integers greater than or equal to 0; $p_1'$ and $q_1'$ are integers greater than or equal to 0 and less than or equal to 6, and $p_1'$ and $q_1'$ are not 0 at the same time; $R_1'$ to $R_{12}'$, $R_a'$, $R_b'$, $R_c'$, and $R_d'$ are separately and independently selected from a hydrogen atom, a halogen atom, an alkyl group, an aryl group, an alkoxy group, a hydroxy group, an ester group, a cyano group, an amino group, a thiol group, and an atom or an atomic group that can replace the foregoing group; and $R_{13}'$, $R_{14}'$, $R_{15}'$, and $R_{16}'$ are separately and independently selected from a hydrogen atom, a halogen atom, an alkyl group, an aryl group, an alkoxy group, a hydroxy group, an ester group, a cyano group, an amino group, a thiol group, and an atom or an atomic group that can replace the foregoing group; or any two, three, or four of $R_{13}'$, $R_{14}'$, $R_{15}'$, and $R_{16}'$ are connected to form a cyclic structure, and a group that does not participate in forming the cyclic structure in $R_{13}'$, $R_{14}'$, $R_{15}'$, and $R_{16}'$ is separately and independently selected from a hydrogen atom, a halogen atom, an alkyl group, an aryl group, an alkoxy group, a hydroxy group, an ester group, a cyano group, an amino group, a thiol group, and an atom or an atomic group that can replace the foregoing group.

In an embodiment of this application, the atom or the atomic group that can replace the foregoing group is an atom or an atom group that can replace a hydrogen atom, a halogen atom, an alkyl group, an aryl group, an alkoxy group, a hydroxy group, an ester group, a cyano group, an amino group, and a thiol group; for example, an isotope atom of a hydrogen atom (such as deuterium), boronane, or a metal ligand.

In an embodiment of this application, the halogen atom may be fluorine, chlorine, bromine, or iodine. In an embodiment of this application, the alkyl group may be an alkyl group whose quantity of carbon atoms is 1 to 20. In an embodiment, the quantity of carbon atoms of the alkyl group is 2 to 10. In an embodiment, the quantity of carbon atoms of the alkyl group is 8 to 20. In an embodiment, the quantity of carbon atoms of the alkyl group is 8 to 15. The alkyl group may be a straight chain, a branched chain, or an alkyl group with a cyclic structure. For example, the alkyl group may be, for example, a methyl group, an ethyl group, a propyl group, or a butyl group. The alkyl group may be a non-substituted alkyl group, or may be a substituted alkyl group. In an embodiment of the application, the aryl group may be an aryl group whose quantity of carbon atoms is 6 to 20. Further, the quantity of carbon atoms of the aryl group may be 6 to 10. Still further, the quantity of carbon atoms of the aryl group may be 7 or 8. The aryl group may be a non-substituted aryl group, or may be a substituted aryl group. In an embodiment of this application, a quantity of carbon atoms of the alkoxy group may be 1 to 20. In an embodiment, the quantity of carbon atoms of the alkoxy group is 2 to 10. In an embodiment, the quantity of carbon atoms of the alkoxy group is 8 to 20. In an embodiment, the quantity of carbon atoms of the alkoxy group is 8 to 15. The alkoxy group may be a straight chain, a branched chain, or an alkoxy group with a cyclic structure.

In an embodiment of this application, the substituents: $R_1$ to $R_{12}$, $R_a$, $R_b$, $R_c$, $R_d$, $R_{13}$, $R_{14}$, $R_{15}$, and $R_{16}$ in the repeat unit shown in Formula (1) and the substituents: $R_1'$ to $R_{12}'$, $R_a'$, $R_b'$, $R_c'$, $R_d'$, $R_{13}'$, $R_{14}'$, $R_{15}'$, and $R_{16}'$ in the repeat unit shown in Formula (2) may be selected according to actual function requirements. A long-chain alkyl group with six or more carbon atoms in a main chain is selected, to increase flexibility of the chain segment, adjust mechanical properties of the polymer, and reduce an internal stress. Polar groups such as an ester group and an amino group are selected, to increase compatibility between the cyclic olefin polymer and another polymer and improve bonding properties of the cyclic olefin polymer. A substituent including a cyclic structure and an aryl group is selected, to improve rigidity and thermal resistance of the material.

In an embodiment of this application, in Formula (1), p and q are integers greater than or equal to 0 and less than or equal to 6. In Formula (2), p' and q' are integers greater than or equal to 0 and less than or equal to 6. For example, p, q, p', and q' each may be 0, 1, 2, 3, 4, 5, or 6. If values of p, q, p', and q' are controlled to be small, a length of the aliphatic group chain segment can be controlled to be short, to effectively avoid microcrystallization caused due to stacking of the aliphatic group chain segment. In this way, good optical properties of the cyclic olefin polymer in a haze, light transmittance, and the like can be obtained. In an embodiment of the application, p=q=1. In an embodiment of the application, p+q=1. In an embodiment of the application, p=q=2. In an embodiment of the application, p=q=0. Similarly, in an embodiment of the application, p'=q'=1. In an embodiment of the application, p'+q'=1. In an embodiment of the application, p'=q'=2. In an embodiment of the application, p'=q'=0. In an embodiment of this application, when p1, q1, p1', and q1' are equal to 0, there are single bonds at corresponding locations.

In an embodiment of the application, the cyclic olefin polymer includes only the repeat unit shown in Formula (1), and both p and q are equal to 0. In this case, the cyclic olefin polymer is equivalent to a product of alternating copolymerization of a bicyclic structure and ethylene.

In an embodiment of this application, in Formula (1), p1 and q1 are integers greater than or equal to 0 and less than or equal to 6, and p1 and q1 are not 0 at the same time. In Formula (2), p1' and q1' are integers greater than or equal to 0 and less than or equal to 6, and p1' and q1' are not 0 at the same time. For example, p1, q1, p1', and q1' each may be 0, 1, 2, 3, 4, 5, or 6.

In an embodiment of this application, in Formula (1), x and y are integers greater than or equal to 0. In an embodiment, x is an integer greater than or equal to 0 and less than or equal to 3. In an embodiment, y is an integer greater than or equal to 0 and less than or equal to 5. For example, x may be, for example, 0 or 1, and y may be, for example, 0, 1, or 2. In an embodiment, x and y are both equal to 0. In an embodiment, x and y are both equal to 1.

In an embodiment of this application, in Formula (2), x' and y' are integers greater than or equal to 0. In an embodiment, x' is an integer greater than or equal to 0 and less than or equal to 3. In an embodiment, y' is an integer greater than or equal to 0 and less than or equal to 5. For example, x' may be, for example, 0 or 1, and y' may be, for example, 0, 1, or 2. In an embodiment, x' and y' are both equal to 0. In an embodiment, x' and y' are both equal to 1.

In an embodiment of this application, the cyclic structure formed through connecting any two, three, or four of $R_{13}$, $R_{14}$, $R_{15}$, and $R_{16}$ may be a saturated or an unsaturated carbocycle, or a saturated or an unsaturated heterocycle. A heteroatom in the heterocycle may be nitrogen, sulfur, oxygen, boron, silicon, or the like. For example, $R_{13}$ and $R_{15}$, $R_{13}$ and $R_{16}$, $R_{14}$ and $R_{15}$, or $R_{14}$ and $R_{16}$ are connected to form a cyclic structure, and the other two groups that do not participate in forming the cyclic structure are separately and independently selected from a hydrogen atom, a halogen atom, an alkyl group, an aryl group, an alkoxy group, a hydroxy group, an ester group, a cyano group, an amino group, a thiol group, and an atom or an atomic group that can replace the foregoing group. For another example, $R_{13}$, $R_{14}$, and $R_{15}$ are connected to form a cyclic structure.

In an embodiment of this application, the cyclic structure formed through connecting any two, three, or four of $R_{13}'$, $R_{14}'$, $R_{15}'$, and $R_{16}'$ may be a saturated or an unsaturated carbocycle, or a saturated or an unsaturated heterocycle. A heteroatom in the heterocycle may be nitrogen, sulfur, oxygen, boron, silicon, or the like. For example, $R_{13}'$ and $R_{15}'$, $R_{13}'$ and $R_{16}'$, $R_{14}'$ and $R_{15}'$, or $R_{14}'$ and $R_{16}'$ are connected to form a cyclic structure, and the other two groups that do not participate in forming the cyclic structure in $R_{13}'$, $R_{14}'$, $R_{15}'$, and $R_{16}'$ are separately and independently selected from a hydrogen atom, a halogen atom, an alkyl group, an aryl group, an alkoxy group, a hydroxy group, an ester group, a cyano group, an amino group, a thiol group, and an atom or an atomic group that can replace the foregoing group. For another example, $R_{13}'$, $R_{14}'$, and $R_{15}'$ are connected to form a cyclic structure.

In an embodiment of this application, the cyclic olefin polymer may be a cyclic olefin homopolymer, or may be a cyclic olefin copolymer.

In an embodiment of this application, the cyclic olefin polymer includes the repeat unit shown in Formula (1), but does not include the repeat unit shown in Formula (2). For example, the cyclic olefin polymer may include repeat units with one or more different structures shown in Formula (1). In an embodiment of the application, the cyclic olefin polymer includes the repeat unit shown in Formula (2), but does not include the repeat unit shown in Formula (1). Similarly, the cyclic olefin polymer may include repeat units with one or more different structures shown in Formula (2).

In an embodiment of this application, the cyclic olefin polymer may also include both the repeat unit shown in Formula (1) and the repeat unit shown in Formula (2), and may be obtained through performing partial hydrogenation on a same cyclic olefin polymer monomer after a ROMP process. The repeat unit with the structure shown in Formula (1) is formed after the ROMP process. After the hydrogenation, some repeat units shown in Formula (1) are hydrogenated to obtain the repeat units shown in Formula (2). Main structures of the two repeat units are the same. An only difference is that unsaturated carbon bonds in the aliphatic group chain segment and unsaturated carbon bonds in each substituent in the repeat unit shown in Formula (1) are saturated carbon bonds in the repeat unit shown in Formula (2). If another substituent does not include an unsaturated carbon bond, a difference between the repeat unit shown in Formula (1) and the repeat unit shown in Formula (2) lies in only the aliphatic group chain segment (that is, an olefinic bond is hydrogenated or unhydrogenated). Substituents at corresponding locations are completely the same between the repeat unit shown in Formula (1) and the repeat unit shown in Formula (2). In some embodiments, the cyclic olefin polymer includes both the repeat unit shown in Formula (1) and the repeat unit shown in Formula (2), or may be obtained through performing partial hydrogenation on two or more different monomers after the ROMP process. In this case, the cyclic olefin polymer may include both the repeat units with a plurality of different structures shown in Formula (1) and the repeat units with a plurality of different structures shown in Formula (2).

In an embodiment of this application, in the repeat unit shown in Formula (2), $R_1'$, $R_2'$, $R_3'$, and $R_4'$ are hydrogen atoms. In this case, the structural formula of the repeat unit shown in Formula (2) is shown in Formula (5):

Formula (5)

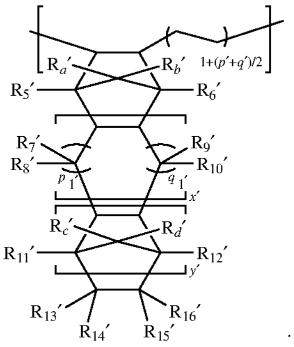

The repeat unit shown in Formula (5) may be considered as a product of alternating copolymerization of a bicyclic structure and $$1+\frac{p'+q'}{2}$$

ethylene. A mole percent of the bicyclic structure is $$\frac{2}{4+p'+q'}\times 100\%.$$

Therefore, relative content of the bicyclic structure can be adjusted through controlling values of p' and q', so that rigidity of the polymer can be adjusted.

In an embodiment of the application, a structural formula of the repeat unit shown in Formula (5) may be shown in Formula (A) to Formula (K):

(A)

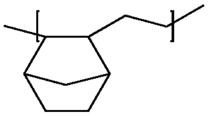

(B)

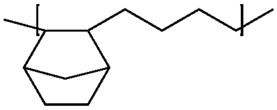

(C)

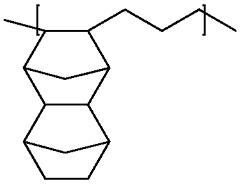

-continued (D)

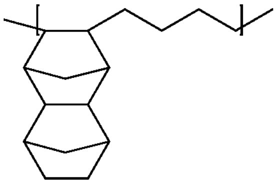

(E)

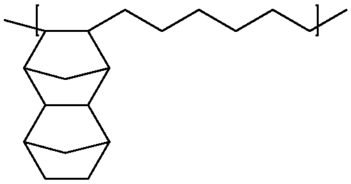

(F)

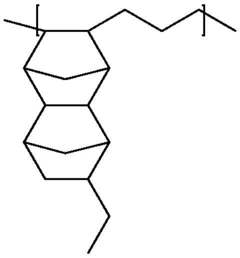

(G)

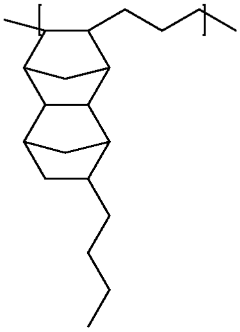

(H)

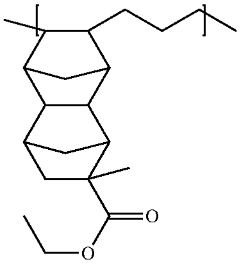

(I)

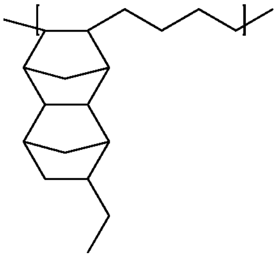

-continued (J)

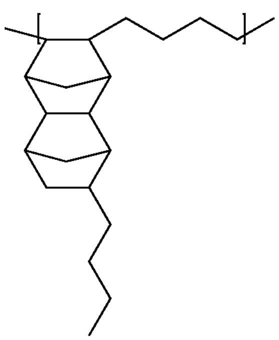

(K)

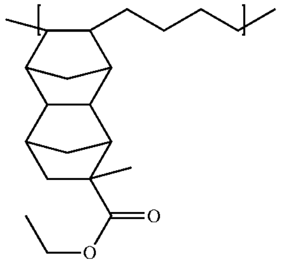

A mole percent of a bicyclic structure in a repeat unit shown in Formula (A) is 50%. Mole percents of bicyclic structures in repeat units shown in Formula (C), Formula (F), Formula (G), and Formula (H) are 40%. Mole percents of bicyclic structures in repeat units shown in Formula (B), Formula (D), Formula (I), Formula (J), and Formula (K) are 33%. A mole percent of a bicyclic structure in a repeat unit shown in Formula (E) is 25%.

When the cyclic olefin polymer includes only the repeat unit shown in Formula (5), the cyclic olefin polymer may be considered as a product of alternating copolymerization of a bicyclic structure and $$1+\frac{p'+q'}{2}$$

ethylene (similar to a polymer in a VAP process). A defect that a ratio between a rigid cyclic olefin monomer and a flexible α-olefin cannot be adjusted in the existing ROMP-hydrogenation process is overcome. Both sequence distribution and relative content of the bicyclic structure in the cyclic olefin polymer can be controlled. Therefore, effect of adjusting both thermodynamic properties and optical properties of the cyclic olefin polymer is achieved.

In an embodiment of this application, the cyclic olefin polymer may include only the repeat unit shown in Formula (1) and/or the repeat unit shown in Formula (2), or may include a repeat unit with another structure according to an actual properties requirement. In an embodiment of this application, in the cyclic olefin polymer, a total mass percent of the repeat unit whose structural formula is shown in Formula (1) and the repeat unit whose structural formula is shown in Formula (2) is greater than or equal to 50%. For example, the total mass percent of the repeat unit whose structural formula is shown in Formula (1) and the repeat unit whose structural formula is shown in Formula (2) may be 50%, 55%, 60%, 65%, 70%, 75%, 80%, 85%, 90%, 95%, and 100%. A greater total mass percent of the repeat unit in Formula (1) and the repeat unit in Formula (2) indicates higher optical properties (for example, a haze) of the cyclic olefin polymer. In an embodiment, a total mass percent of the two repeat units in Formula (1) and Formula (2) in the cyclic olefin polymer may be 100%. For example, in an embodiment, the cyclic olefin polymer may include only the repeat unit shown in Formula (1). In an embodiment, the cyclic olefin polymer may include only the repeat unit shown in Formula (2). In an embodiment, the cyclic olefin polymer may include only the repeat unit shown in Formula (1) and the repeat unit shown in Formula (2).

In an embodiment of this application, the cyclic olefin polymer further includes a repeat unit whose structural formula is shown in Formula (3):

Formula (3)

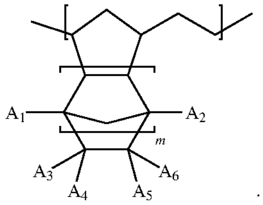

.

In Formula (3), m is an integer greater than or equal to 0 and less than or equal to 10, and $A_1$ and $A_2$ are separately and independently selected from a hydrogen atom, a halogen atom, an alkyl group, an aryl group, an alkoxy group, a hydroxy group, an ester group, a cyano group, an amino group, a thiol group, and an atom or an atomic group that can replace the foregoing group; and $A_3$, $A_4$, $A_5$, and $A_6$ are separately and independently selected from a hydrogen atom, a halogen atom, an alkyl group, an aryl group, an alkoxy group, a hydroxy group, an ester group, a cyano group, an amino group, a thiol group, and an atom or an atomic group that can replace the foregoing group; or any two, three, or four of $A_3$, $A_4$, $A_5$, and $A_6$ are connected to form a cyclic structure, and a group that does not participate in forming the cyclic structure in $A_3$, $A_4$, $A_5$, and $A_6$ is separately and independently selected from a hydrogen atom, a halogen atom, an alkyl group, an aryl group, an alkoxy group, a hydroxy group, an ester group, a cyano group, an amino group, a thiol group, and an atom or an atomic group that can replace the foregoing group. A selection range of a substituent such as a halogen atom, an alkyl group, an aryl group, an alkoxy group, a hydroxy group, an ester group, a cyano group, an amino group, or a thiol group may be the same as that of the substituent in Formula (1) and Formula (2). It is easy to obtain a monomer of the repeat unit shown in Formula (3). The costs of the cyclic olefin polymer can be reduced by using the simple commercial monomer. In addition, rigidity of the material can be improved to some extent, to reconcile mechanical properties.

In an embodiment of this application, in Formula (3), a larger value of m indicates a higher glass transition temperature and a larger internal stress of the obtained cyclic olefin polymer. In order that the cyclic olefin polymer obtains a proper glass transition temperature, to control the internal stress at a low level and improve molding properties and processability, a value range of m is controlled within a range of 0 to 10 in an embodiment of the application. In an embodiment of this application, m is an integer from 0 to 5. For example, m is 0, 1, 2, 3, 4, or 5. The cyclic structure formed through connecting any two, three, or four of $A_3$, $A_4$, $A_5$, and $A_6$ may be a saturated or an unsaturated carbocycle, or a saturated or an unsaturated heterocycle. A heteroatom in the heterocycle may be nitrogen, sulfur, oxygen, boron, silicon, or the like.

In an embodiment of this application, in the cyclic olefin polymer, a mass percent of the repeat unit whose structural formula is shown in Formula (3) is less than or equal to 50%. For example, in the cyclic olefin polymer, the mass percent of the repeat unit whose structural formula is shown in Formula (3) may be but is not limited to 50%, 40%, 30%, 20%, 10%, and 5%.

In an embodiment of this application, a weight average molecular weight of the cyclic olefin polymer is 10000 to 200000. A larger molecular weight indicates better mechanical properties and a higher strength of the material. However, in this case, processing difficulty increases, and viscosity is high in a melted state. This is unfavorable to processing and molding. When the molecular weight is small, the processing is easy, and a yield of the molding is high. To balance the mechanical properties and the molding properties, in an embodiment of this application, a weight average molecular weight of the cyclic olefin polymer is controlled within 30000 to 60000.

In an embodiment of this application, a refractive index of the cyclic olefin polymer is 1.53 to 1.58, and may be 1.53, 1.54, 1.55, 1.56, 1.57, or 1.58. The cyclic olefin polymer has a high refractive index. A lens thickness of an optical lens can be reduced when the optical lens is made of the cyclic olefin polymer. The refractive index of the cyclic olefin polymer can be tested according to the ASTM D542 test standard.

In an embodiment of this application, an Abbe number of the cyclic olefin polymer is greater than or equal to 53. For example, the Abbe number may be, for example, 53, 54, 55, 56, or 57. The Abbe number indicates an index of a dispersion capability of a transparent material. A lower Abbe number indicates greater dispersion. A proper Abbe number indicates that a dispersion phenomenon of the material can be controlled to a low level.

In an embodiment of this application, a haze of the cyclic olefin polymer is less than 0.2%. The haze, namely, haziness is defined as a percentage of a scattered luminous flux of a material to a passed luminous flux of the material. The haze may be used to measure a degree of obscureness or haziness of a transparent material or a translucent material, and is an indicator indicating scattering. The haze is generated due to a cloudy appearance or a haze appearance caused by light scattering inside the material or on an external surface of the material. Based on a small haze, visual effect of an optical lens can be improved when the optical lens is made of the cyclic olefin polymer. In an embodiment of this application, a haze of the cyclic olefin polymer is less than 0.1%. In an embodiment of this application, a haze of the cyclic olefin polymer is less than 0.05%.

In an embodiment of this application, a visible light transmittance of the cyclic olefin polymer is greater than or equal to 90%. In an embodiment of this application, the transmittance of the cyclic olefin polymer is greater than or equal to 92%. In an embodiment of this application, the transmittance of the cyclic olefin polymer is greater than or equal to 95%.

In an embodiment of this application, the glass transition temperature of the cyclic olefin polymer is greater than 100° C. For example, the glass transition temperature may be greater than 100° C. and less than or equal to 160° C. For example, the glass transition temperature may be 110° C., 120° C., 130° C., 140° C., 150° C., or 160° C. The cyclic olefin polymer has a proper glass transition temperature, to improve molding properties and processability of the cyclic olefin polymer material.

In an embodiment of this application, the cyclic olefin polymer further has excellent mechanical properties.

In an embodiment of this application, a tensile strength of the cyclic olefin polymer is greater than or equal to 30 MPa For example, the tensile strength may be, for example, 30 MPa to 150 MPa. The tensile strength indicates a stress of the material at maximum uniform plastic deformation. In a tensile test, a maximum tensile stress on a sample before the sample is broken is the tensile strength. A greater tensile strength indicates a stronger damage-resistant capability of the material.

In an embodiment of this application, an elongation at break of the cyclic olefin polymer is greater than or equal to 6% For example, the elongation at break may be, for example, 6% to 15%. The elongation at break indicates a tensile rate. When the material is elongated to be broken due to an external force, a ratio of an elongation length after the elongation to a length before the elongation is referred to as the elongation at break. A high elongation at break indicates that the material has high toughness, low brittleness, and a small internal stress, to facilitate injection molding.

In an embodiment of this application, a flexural modulus of the cyclic olefin polymer is greater than 2000 MPa. The flexural modulus is a ratio of a flexural stress to a flexural strain.

In an embodiment of this application, a flexural strength of the cyclic olefin polymer is greater than or equal to 40 MPa. For example, the flexural strength may be, for example, 40 MPa to 120 MPa. The flexural strength indicates a maximum stress that the material can bear before the material is bent to be broken or when the material reaches a specified bending moment. The stress is a maximum positive stress during bending. The flexural strength reflects a bending resistance capability of the material, and can be used to measure bending properties of the material. A greater flexural strength indicates a stronger bending resistance capability of the material.

In this an embodiment of this application, the haze and a light transmittance of the cyclic olefin polymer are tested according to the ASTM D1003 test standard. The tensile strength and the elongation at break of the cyclic olefin polymer are tested according to the ASTM D638 test standard. The flexural strength of the cyclic olefin polymer is tested according to the ASTM D790 test standard. The flexural modulus is tested according to the ASTM D256 test standard.

It can be learned from the foregoing that the cyclic olefin polymer provided in an embodiment of the application has both excellent optical properties and excellent mechanical properties, and has excellent processability and excellent molding properties.

Correspondingly, an embodiment of this application further provides a cyclic olefin polymer monomer. A chemical structural formula of the cyclic olefin polymer monomer is shown in Formula (4):

Formula (4)

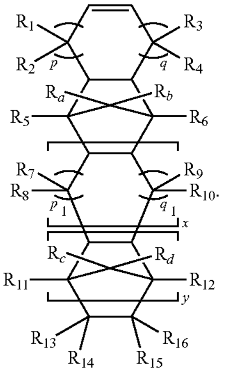

In Formula (4), p and q are integers greater than or equal to 0 and less than or equal to 6; x and y are integers greater than or equal to 0; $p_1$ and $q_1$ are integers greater than or equal to 0 and less than or equal to 6, and $p_1$ and $q_1$ are not 0 at the same time; $R_1$ to $R_{12}$, $R_a$, $R_b$, $R_c$, and $R_d$ are separately and independently selected from a hydrogen atom, a halogen atom, an alkyl group, an aryl group, an alkoxy group, a hydroxy group, an ester group, a cyano group, an amino group, a thiol group, and an atom or an atomic group that can replace the foregoing group; and $R_{13}$, $R_{14}$, $R_{15}$, and $R_{16}$ are separately and independently selected from a hydrogen atom, a halogen atom, an alkyl group, an aryl group, an alkoxy group, a hydroxy group, an ester group, a cyano group, an amino group, a thiol group, and an atom or an atomic group that can replace the foregoing group; or any two, three, or four of $R_{13}$, $R_{14}$, $R_{15}$, and $R_{16}$ are connected to form a cyclic structure, and a group that does not participate in forming the cyclic structure in $R_{13}$, $R_{14}$, $R_{15}$, and $R_{16}$ is separately and independently selected from a hydrogen atom, a halogen atom, an alkyl group, an aryl group, an alkoxy group, a hydroxy group, an ester group, a cyano group, an amino group, a thiol group, and an atom or an atomic group that can replace the foregoing group.

In an embodiment of this application, the substituents: $R_1$ to $R_{12}$, $R_a$, $R_b$, $R_c$, $R_d$, $R_{13}$, $R_{14}$, $R_{15}$, and $R_{16}$ in the cyclic olefin polymer monomer may be selected according to an actual function requirement. Cyclic olefin polymers with different properties can be obtained through introducing different substituents at different locations in cyclic olefin polymer monomers to modify the polymers.

In an embodiment of this application, the atom or the atomic group that can replace the foregoing group is an atom or an atom group that can replace a hydrogen atom, a halogen atom, an alkyl group, an aryl group, an alkoxy group, a hydroxy group, an ester group, a cyano group, an amino group, and a thiol group; and may be, for example, an isotope atom of a hydrogen atom (such as deuterium), boronane, or a metal ligand.

In an embodiment of this application, the halogen atom may be fluorine, chlorine, bromine, or iodine. In an embodiment of this application, the alkyl group may be an alkyl group whose quantity of carbon atoms is 1 to 20. In an embodiment, the quantity of carbon atoms of the alkyl group is 2 to 10. In an embodiment, the quantity of carbon atoms of the alkyl group is 8 to 20. In an embodiment, the quantity of carbon atoms of the alkyl group is 8 to 15. The alkyl group may be a straight chain, a branched chain, or an alkyl group with a cyclic structure. For example, the alkyl group may be, for example, a methyl group, an ethyl group, a propyl group, or a butyl group. The alkyl group may be a non-substituted alkyl group, or may be a substituted alkyl group. In an embodiment of this application, the aryl group may be an aryl group whose quantity of carbon atoms is 6 to 20. Further, the quantity of carbon atoms of the aryl group may be 6 to 10. Still further, the quantity of carbon atoms of the aryl group may be 7 or 8. The aryl group may be a non-substituted aryl group, or may be a substituted aryl group. In an embodiment of this application, a quantity of carbon atoms of the alkoxy group may be 1 to 20. In an embodiment, the quantity of carbon atoms of the alkoxy group is 2 to 10. In an embodiment, the quantity of carbon atoms of the alkoxy group is 8 to 20. In an embodiment, the quantity of carbon atoms of the alkoxy group is 8 to 15. The alkoxy group may be a straight chain, a branched chain, or an alkoxy group with a cyclic structure.

In an embodiment of this application, in Formula (4), p and q are integers greater than or equal to 0 and less than or equal to 6. For example, p and q each may be 0, 1, 2, 3, 4, 5, or 6. Herein, p and q may be 0 at the same time. In an embodiment of this application, p=q=1, that is, a cyclic structure in which an olefinic bond is located is a six-membered ring structure. In an embodiment of this application, p+q=1, that is, a cyclic structure in which an olefinic bond is located is a five-membered ring structure. In an embodiment of this application, p=q=2, that is, a cyclic structure in which an olefinic bond is located is an eight-membered ring structure.

In an embodiment of this application, in Formula (4), p1 and q1 are integers greater than or equal to 0 and less than or equal to 6, and p1 and q1 are not 0 at the same time. For example, p1 and q1 each may be 0, 1, 2, 3, 4, 5, or 6. In an embodiment of this application, p1=q1=1, that is, a corresponding cyclic structure is a six-membered ring structure. In an embodiment of this application, p1+q1=1, that is, a corresponding cyclic structure is a five-membered ring structure. In an embodiment of this application, p1=q1=2, that is, a corresponding cyclic structure is an eight-membered ring structure.

In an embodiment of this application, when p, q, p1, and q1 are equal to 0, there are single bonds at corresponding locations.

In an embodiment of this application, in Formula (4), x and y are integers greater than or equal to 0. In an embodiment, x is an integer greater than or equal to 0 and less than or equal to 3. In an embodiment, y is an integer greater than or equal to 0 and less than or equal to 5. For example, x may be, for example, 0 or 1, and y may be, for example, 0, 1, or 2. In an embodiment, x and y are both equal to 0. In an embodiment, x and y are both equal to 1.

In an embodiment of this application, the cyclic structure formed through connecting any two, three, or four of $R_{13}$, $R_{14}$, $R_{15}$, and $R_{16}$ may be a saturated or an unsaturated carbocycle, or a saturated or an unsaturated heterocycle. A heteroatom in the heterocycle may be nitrogen, sulfur, oxygen, boron, silicon, or the like. For example, $R_{13}$ and $R_{15}$, $R_{13}$ and $R_{16}$, $R_{14}$ and $R_{15}$, or $R_{14}$ and $R_{16}$ are connected to form a cyclic structure, and the other two groups that do not participate in forming the cyclic structure are separately and independently selected from a hydrogen atom, a halogen atom, an alkyl group, an aryl group, an alkoxy group, a hydroxy group, an ester group, a cyano group, an amino group, a thiol group, and an atom or an atomic group that can replace the foregoing group.

The cyclic olefin polymer monomer provided in an embodiment of the application includes both a saturated bicyclic structure and a lipid cyclic structure with an unsaturated double bond. The cyclic olefin polymer that includes the repeat unit shown in Formula (1) and/or the repeat unit shown in Formula (2) in an embodiment of the application may be prepared through the ROMP process or the ROMP-hydrogenation process performed on the cyclic olefin polymer monomer. A process is shown in Formula (a). In a ROMP-polymerization reaction process, the rigid bicyclic structure is retained in the polymer structure, and the lipid cyclic structure with an unsaturated double bond is opened to form a flexible aliphatic group chain segment. In a hydrogenation process, the unsaturated double bond is changed to a saturated carbon bond.

Formula (a)

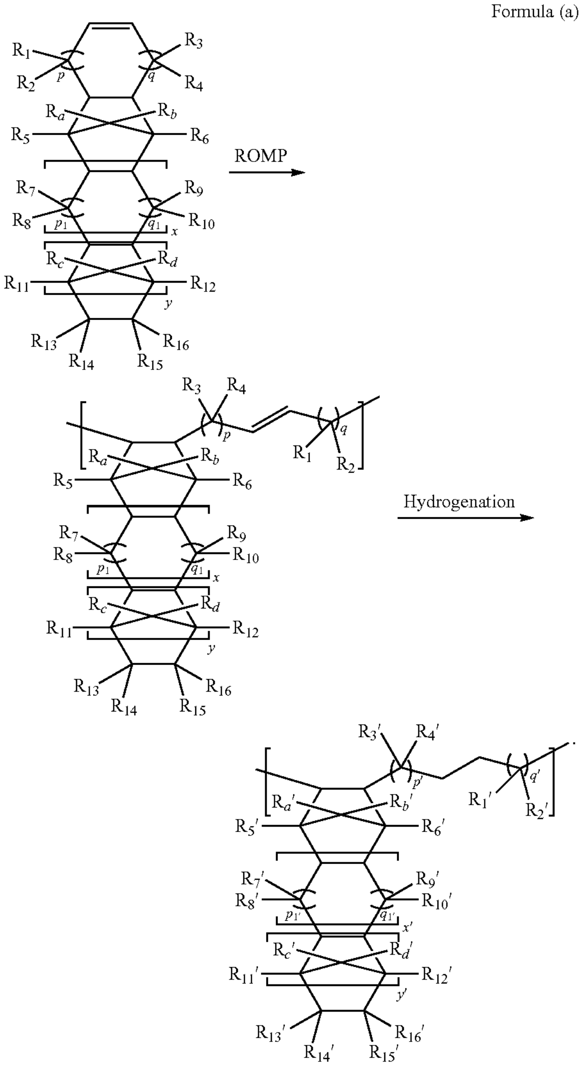

It should be noted that, in the hydrogenation process, an unsaturated carbon bond in the substituents: $R_1$ to $R_{12}$, $R_a$, $R_b$, $R_c$, $R_d$, $R_{13}$, $R_{14}$, $R_{15}$, and $R_{16}$ may also be changed to a saturated carbon bond. Therefore, it may be understood that, in the repeat units in the cyclic olefin polymer before and after the hydrogenation shown in Formula (a), the substituents: $R_1$ to $R_{12}$, $R_a$, $R_b$, $R_c$, $R_d$, $R_{13}$, $R_{14}$, $R_{15}$, and $R_{16}$ at corresponding locations may be the same as or different from $R_1'$ to $R_{12}'$, $R_a'$, $R_b'$, $R_c'$, $R_d'$, $R_{13}'$, $R_{14}'$, $R_{15}'$, and $R_{16}'$. When the substituent in the monomer includes unsaturated carbon bonds, the unsaturated carbon bonds may be partially or fully changed to saturated carbon bonds after the hydrogenation.

The new cyclic olefin polymer monomer provided in an embodiment of the application includes both an unsaturated lipid cyclic structure and a saturated bicyclic structure. When the cyclic olefin polymer is prepared through polymerization performed on the monomer, the relative content and the sequence distribution of the rigid bicyclic structure and the flexible aliphatic group chain segment in the cyclic olefin polymer may be regulated at the same time, to obtain the cyclic olefin polymer in which the rigid bicyclic structure and the aliphatic group chain segment of a length are alternatingly arranged. In this way, the thermodynamic properties and the optical properties of the cyclic olefin polymer are regulated at the same time, and the cyclic olefin polymer with both excellent thermodynamic properties and excellent optical properties is obtained.

In an embodiment of this application, a structural formula of the cyclic olefin polymer monomer is shown in Formula (6), and includes an unsaturated cyclohexene structure and a saturated dimethanooctahydronaphthalene structure.

Formula (6)

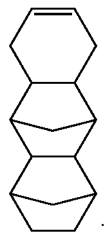

After the ROMP-hydrogenation process, a structure of alternating copolymerization of dimethanooctahydronaphthalene and a C4 chain segment in the polymer may be obtained in the cyclic olefin polymer monomer shown in Formula (6), and the obtained cyclic olefin polymer is equivalent to a product of alternating copolymerization of dimethanooctahydronaphthalene and two ethylenes.

In an embodiment of this application, main raw materials used for preparing the cyclic olefin polymer monomer include but are not limited to ethylene, norbornene, cyclopentadiene, butadiene, alicyclic diolefin, α-substituted olefin, methyl propiolate, acrylate, and the like.

In an embodiment of this application, the cyclic olefin polymer monomer may be synthesized mainly through a Diels-Alder reaction ([4+2] ring addition reaction). Certainly, another existing well-known method may also be used for the cyclic olefin polymer monomer.

In an embodiment of this application, when the ROMP polymerization reaction is performed on the cyclic olefin polymer monomer, the ROMP polymerization reaction occurs in an inert atmosphere. Nitrogen, argon, or the like may be selected as an inert gas. A polymerization reaction system mainly includes a cyclic olefin monomer, a catalyst, a solvent, and a terminator. The cyclic olefin monomer includes the foregoing cyclic olefin polymer monomer in this application. Alternatively, another cyclic olefin monomer may be selected for copolymerization, for example, norbornene and a derivative thereof, or alicyclic olefin. The catalyst may be one or more of a W compound, a Ru compound, a Mo compound, a Re compound, a V compound, or the like. The Ru compound may be a Grubbs catalyst or the like, for example, a first-generation catalyst:

benzylidene-bis(tricyclohexylphosphine)dichlororuthenium, or a second-generation catalyst: (1,3-bis-(2,4,6-trimethylphenyl)-2-imidazolidinylidene)dichloro(o-isopropoxyphenylmethylene)ruthenium. The Mo compound may be a Schrock catalyst, $MoO_3$, $MoCl_5$, or the like. The W compound may be $WCl_6$, $WOCl_4$, $W(CO)_6$, or the like. The Re compound may be $ReCl_5$, $Re_2O_7$, $ReOCl_3$, or the like. The V compound may be $VCl_4$, $VOCl_3$, $V_2O_5$, or the like. The solvent may be a common organic solvent that can dissolve all reactants and a generated polymer, for example, one or more of solvents such as branched-chain alkanes, cycloalkanes, aromatic hydrocarbons (such as benzene and toluene), chlorinated paraffins (such as dichloromethane, chlorobutane, and bromohexane), saturated carboxylates (such as ethyl acetate, n-butyl acetate, isobutyl acetate, and methyl propionate), ethers (such as dibutyl ether, tetrahydrofuran, and 1,1-dimethoxyethane). In an embodiment of this application, the solvent is an alicyclic hydrocarbon such as cyclohexane that can dissolve the foregoing cyclic olefin monomer, the catalyst, and the generated cyclic olefin polymer, an aromatic hydrocarbon such as toluene, or a mixture of a plurality of solvents. There are two main functions of the terminator. One is to selectively remove a transition metal from an end of a chain segment of the polymer to terminate a reaction. The other is to introduce a functional group at an end of a chain segment. The selected terminator in this application may be a vinyl ether compound.

In an embodiment of this application, a mass concentration of the cyclic olefin monomer in a ROMP reaction system is 2 wt % to 20 wt %, and may further be 5 wt % to 15 wt %. A ratio of a total mole number of the cyclic olefin monomer to a mole number of the catalyst may be greater than 500/1, and may further be greater than 1000/1. A ROMP reaction temperature may be 25° C. to 180° C., and may further be 40° C. to 100° C. A reaction time may be set according to an actual requirement, and may be 0.1 hour to 10 hours, further be 0.1 hour to 5 hours, and still further be 0.1 hour to 3 hours.

In an embodiment of this application, a well-known method may also be used for a hydrogenation operation of an unsaturated polymer obtained after the ROMP polymerization reaction. In an embodiment of this application, a hydrogenation rate of the unsaturated polymer is greater than 80%. In an embodiment of this application, the hydrogenation rate is greater than 90%, further greater than 95%, and still further greater than 99%.

In an embodiment of this application, a preparation process of preparing the cyclic olefin polymer including the repeat units shown in Formula (A) to Formula (E) may be as follows:

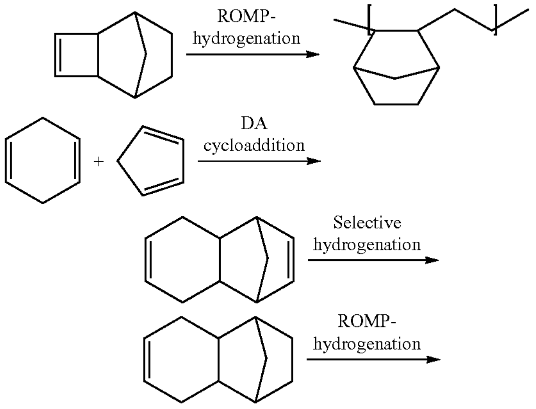

-continued

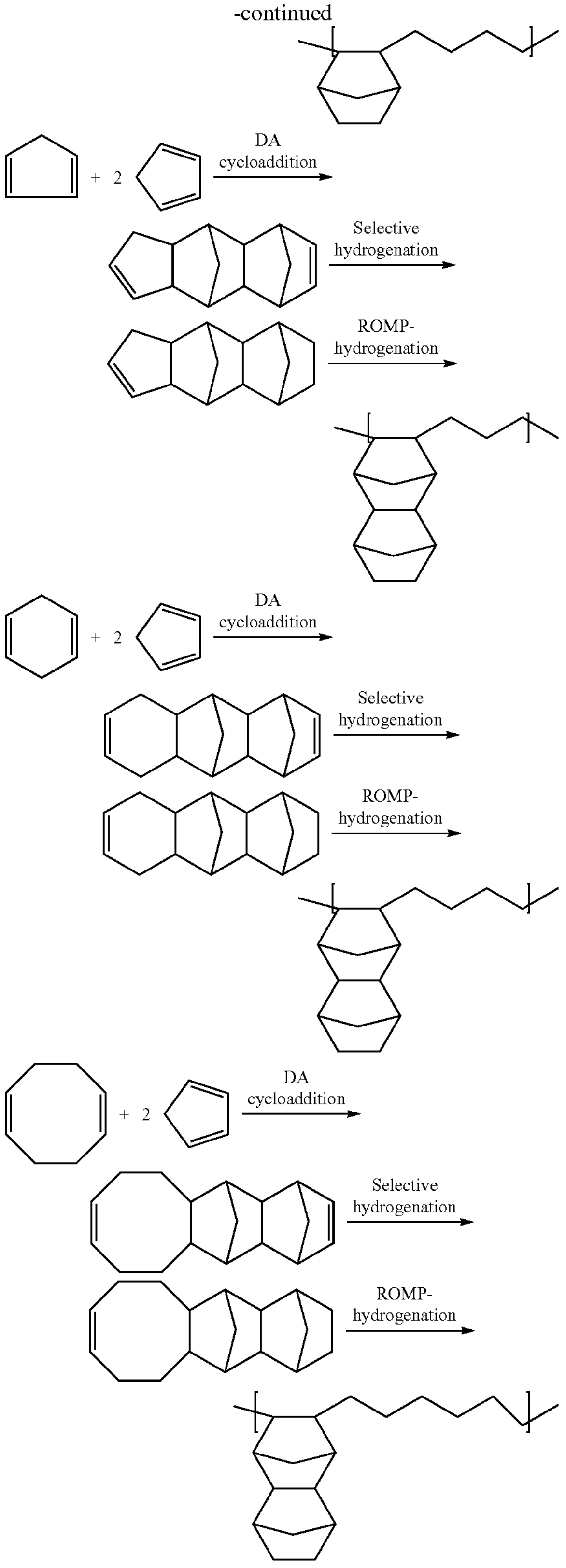

In an embodiment of this application, cyclic olefin polymer monomers with two or more different structures may be copolymerized to obtain a cyclic olefin polymer. In an embodiment of this application, cyclic olefin polymer monomers with two different structures are copolymerized to obtain a cyclic olefin polymer. A chemical equation is shown in Formula (b):

Formula (b)

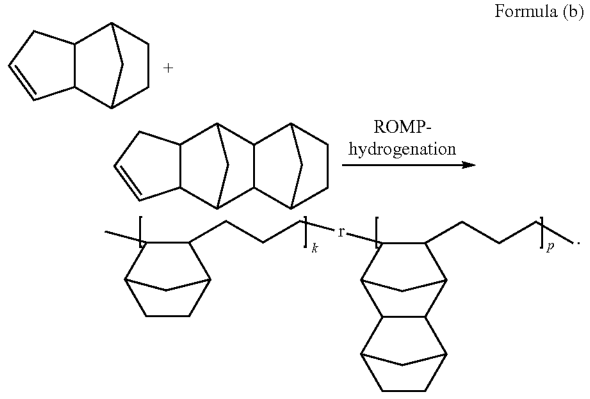

Herein, k and p represent degrees of polymerization, and r represents random copolymerization. In addition, k:p may be in a range from 1:4 to 4:1. Mechanical properties and heat resistance of the material may be regulated through adjusting a ratio of k:p. For example, k:p may be 1:4, 1:3, 1:2, 1:1, 2:1, 3:1, or 4:1.

The cyclic olefin polymer provided in an embodiment of the application has both excellent mechanical properties and excellent optical properties, and excellent processability and excellent molding properties. The cyclic olefin polymer may be used to prepare various optical materials. An embodiment of this application further provides an optical material, including the foregoing cyclic olefin polymer in embodiments of this application.

In an embodiment of this application, the optical material may further include an additive. The additive may include one or more of an antioxidant, a plasticizer, an anti-aging agent, and a heat stabilizer; and may further include one or more of a filler, a dye, a photostabilizer, an ultraviolet absorber, a flame retardant, an antistatic agent, a mold release agent, and an antibacterial agent. Certainly, the optical material may further include another polymer. The another polymer may be another cyclic olefin polymer different from that in embodiments of this application, or may be a non-cyclic olefin polymer. For example, a proper quantity of polymers may be added as required.

In an embodiment of this application, in the optical material, a mass percent of the cyclic olefin polymer in an embodiment of the application is greater than or equal to 60%. For example, in the optical material, the mass percent of the cyclic olefin polymer in an embodiment of the application is 60%, 70%, 80%, or 90%.

An embodiment of this application further provides an optical product. The optical product includes the foregoing cyclic olefin polymer in embodiments of this application, or includes the foregoing optical material in embodiments of this application. The foregoing cyclic olefin polymer or optical material may be processed to obtain the optical product by using various known molding methods. The optical product may be partially obtained through processing the foregoing cyclic olefin polymer or optical material, or may be fully obtained through processing the foregoing cyclic olefin polymer or optical material.

In an embodiment of this application, the optical product may include an optical lens, an optical film, an optical disc, a light guide plate, or a display panel.

In an embodiment of this application, the optical lens may include an eyeglass lens, a camera lens, a sensor lens, an illumination lens, an imaging lens, and the like. The camera lens may be a mobile phone camera lens, a notebook computer camera lens, a desktop camera lens, a vehicle camera lens, or the like. The glasses lens may include a lens of myopic glasses, a lens of presbyopic glasses, a lens of sunglasses, a correction lens of a contact lens, a lens of goggles, and the like. The sensor lens may be a motion detector lens, a proximity sensor lens, an attitude control lens, an infrared sensor lens, or the like. The illumination lens may be an indoor illumination lens, an outdoor illumination lens, a vehicle headlight lens, a vehicle fog light lens, a vehicle tail light lens, a vehicle running light lens, a vehicle fog light lens, a vehicle internal lens, a light-emitting diode (LED) lens, an organic light-emitting diode (OLED) lens, or the like. The imaging lens may be a scanner lens, a projector lens, a telescope lens, a microscope lens, a magnifier lens, or the like.

In an embodiment of this application, the optical film may include a light guide film, a reflective film, an anti-reflective film, a diffusion film, a light filter film, a polarization film, a light splitting film, a phase film, and the like. The optical film may be used in the display field, the illumination field, and the like. For example, the optical film may be used as a film for a liquid crystal substrate.

An embodiment of this application further provides a device, including the foregoing optical product in embodiments of this application. The device may include a mobile terminal, glasses, a camera, a vehicle (for example, a car, a motorcycle, or a train), an illumination device (for example, a desk lamp, a ceiling lamp, or a street lamp), an imaging device (for example, a microscope, a telescope, a projector, or a scanner), and the like. The mobile terminal may include various handheld devices (such as various mobile phones, tablet computers, mobile notebook computers, and netbooks) with a wireless communication function, wearable devices (such as smartwatches), or other processing devices connected to a wireless modem, and various forms of user equipment (UE), mobile stations (MS), terminal devices, and the like.

In an embodiment of this application, the device is a mobile terminal, the mobile terminal includes a camera module, the camera module includes a camera lens, and the camera lens is prepared by using the foregoing cyclic olefin polymer in embodiments of this application.

In an embodiment of this application, the device is a vehicle, the vehicle includes a camera module, the camera module includes a camera lens, and the camera lens is prepared by using the foregoing cyclic olefin polymer in embodiments of this application.

The following further describes embodiments of this application through a plurality of embodiments.

Embodiment 1

A method for preparing a cyclic olefin polymer includes the following operations:

(1) Dicyclopentadiene is put into a flask, reduced-pressure distillation is performed at 210° C., and a fraction is collected to obtain cyclopentadiene. Norbornene and cyclopentadiene are put into a flask according to a mole ratio of 1:1.1, heating and stirring are performed at 200° C. for 10 hours, and tetracyclo[4.4.0.$1^{2,5}$.$1^{7,10}$]dedec-3-ene (tetracyclo [4.4.0.$1^{2,5}$.$1^{7,10}$]dedec-3-ene, TCD) is obtained through reduced-pressure distillation. This process is shown in a chemical equation 3.

(2) TCD, 4-methyl benzenemethanol (1 wt %), and butadiene (a mole ratio of norbornene to butadiene is 1:1.2) are put into a flask, heating and stirring are performed at 250° C. for 10 hours, and then pentacyclo[6.6.1.$1^{10,13}$.$0^{2,7}$.$0^{9,14}$]-hexadec-4-ene (pentacyclo[6.6.1.$1^{10,13}$.$0^{2,7}$.$0^{9,14}$]-hexadec-4-ene, PCH) is obtained through reduced-pressure distillation. This process is shown in the chemical equation 3.

Chemical equation 3

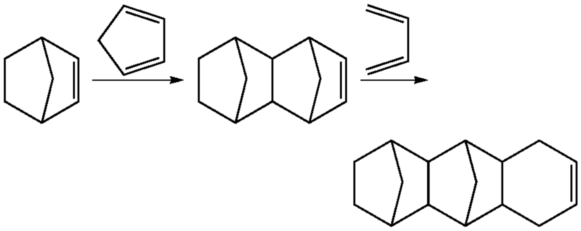

(3) PCH is dissolved in toluene in a round-bottom flask, a Grubbs catalyst (0.5 wt %) is added, and the air in the flask is replaced with nitrogen to keep a reaction system in a nitrogen atmosphere. After the reaction proceeds at a room temperature for 2 hours, excessive ethyl vinyl ether is added, and further stirring is performed at the room temperature for 20 minutes.

Post-processing: A reaction solution is gradually dripped into methanol for reprecipitation, a precipitate is obtained, the precipitate is eluted with methanol for three times, and drying is performed in a vacuum oven at 40° C. overnight to obtain an unsaturated cyclic olefin polymer.

(4) Hydrogenation: The unsaturated cyclic olefin polymer, p-toluenesulfonyl hydrazide, and tripropylamine are added to a round-bottom flask according to a mole ratio of 1:5:5.5, a small amount of butylated hydroxytoluene is added, the air in the flask is replaced with nitrogen, and then an amount of toluene is added in the nitrogen atmosphere. The reaction system is stirred and heated at 110° C. for redistillation for 6 hours. A mixed solution after the reaction is further precipitated in methanol, and a white solid is obtained through filtration. The white solid is washed with deionized water and then dissolved in hot toluene. After that, reprecipitation is performed in toluene. The above filtration, dissolution, and reprecipitation operations are repeated twice. The white solid obtained after filtration is dried in a 50° C. vacuum oven for 24 hours, and the obtained solid is a saturated cyclic olefin polymer. This process is shown in a chemical equation 4.

Chemical equation 4

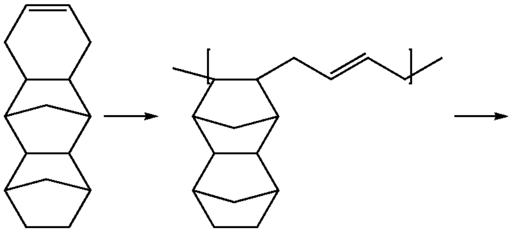

-continued

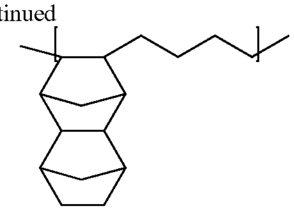

The cyclic olefin polymer obtained in Embodiment 1 of this application is equivalent to a product of alternating copolymerization of dimethanooctahydronaphthalene and two ethylene molecules. A mole percent of dimethanooctahydronaphthalene is 33%. A weight average molecular weight Mw of the cyclic olefin polymer is 50000. A PDI (Polymer dispersity index, polymer dispersion index) is 2.0. The cyclic olefin polymer has excellent injection molding properties. Herein, Tg is about 135° C. An obtained injection molding part has a low internal stress. In addition, the cyclic olefin polymer has excellent optical properties (a visible light transmittance is greater than 90%, a refractive index is 1.53 to 1.55, an Abbe number is 56, and a haze is less than 0.1%). In addition, the cyclic olefin polymer material further has excellent mechanical properties. A tensile strength is 60 MPa, an elongation at break is 7%, a flexural strength is 100 MPa, and a flexural modulus is 2900 MPa.

Embodiment 2

(1) Dicyclopentadiene is put into a flask, reduced-pressure distillation is performed at 210° C., and a fraction is collected to obtain cyclopentadiene. 1,4-cyclohexadiene and cyclopentadiene (1.1 eq) are put into a flask according to a ratio, heating is performed at 200° C. for 10 hours, and tricyclo[4.4.0.$1^{2,5}$]-undec-3,8-diene (tricyclo[4.4.0.$1^{2,5}$]-undec-3,8-diene, TCUD) is obtained through reduced-pressure distillation.

(2) TCUDE and cyclopentadiene (a mole ratio is 1:1.2), and 4-methyl benzenemethanol (1 wt %) are put into a flask according to a ratio, heating is performed at 200° C. for 10 hours, and then pentacyclo[6.6.1.$1^{3,6}$.$0^{2,7}$.$0^{9,14}$]-hexadec-4,11-diene (pentacyclo[6.6.1.$1^{3,6}$.$0^{2,7}$.$0^{9,14}$]-hexadec-4,11-diene, PCHD) is obtained through reduced-pressure distillation.

(3) In a 250 mL round-bottom flask, PCHD is dissolved in cyclohexane, and a catalyst (Pd—B/γ-$Al_2O_3$ amorphous blend, 1 wt %) is added. After the air in the reaction system is replaced with nitrogen, hydrogen enters the reaction system, and a hydrogen pressure is maintained at 1.5 MPa. After the reaction system is violently stirred at 110° C. for 4 hours, pure pentacyclo[6.6.1.$1^{10,13}$.$0^{2,7}$.$0^{9,14}$]-hexadec-4-ene (pentacyclo[6.6.1.$1^{10,13}$.$0^{2,7}$.$0^{9,14}$]-hexadec-4-ene, PCH) is obtained through reduced-pressure distillation. This process is shown in a chemical equation 5. A subsequent aggregation operation is the same as that in Embodiment 1. Details are not described herein again.

Chemical equation 5

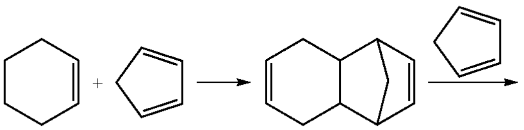

-continued

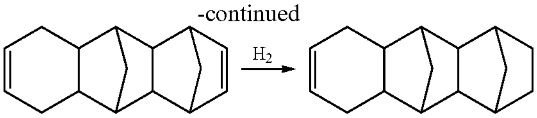

The cyclic olefin polymer obtained in Embodiment 2 of this application is the same as that in Embodiment 1.

Embodiment 3

(1) Dicyclopentadiene is put into a flask, reduced-pressure distillation is performed at 210° C., and a fraction is collected to obtain cyclopentadiene. 1,5-cyclooctadiene and cyclopentadiene are added into a flask according to a mole ratio of 1:2.2, 4-methyl benzenemethanol (1 wt %) is added, heating is performed at 200° C. for 10 hours, and pentacyclo $[8.6.1.1^{12,15}.0^{2,9}.0^{11,16}]$-octadec-5,13-diene (pentacyclo $[8.6.1.1^{12,15}.0^{2,9}.0^{11,16}]$-octadec-5,13-diene, PCOD) is obtained through reduced-pressure distillation.

(2) In a 250 mL round-bottom flask, PCOD is dissolved in cyclohexane, and a catalyst (Pd—B/γ-$Al_2O_3$ amorphous blend, 1 wt %) is added. After the air in the reaction system is replaced with nitrogen, hydrogen enters the reaction system, and a hydrogen pressure is maintained at 1.5 MPa. After the reaction system is violently stirred at 110° C. for 4 hours, pure pentacyclo$[8.6.1.1^{12,15}.0^{2,9}.0^{11,16}]$-octadec-5-ene (pentacyclo$[8.6.1.1^{12,15}.0^{2,9}.0^{11,16}]$-octadec-5-ene, PCO) is obtained through reduced-pressure distillation. This process is shown in a chemical equation 6. Subsequent polymerization, hydrogenation, and post-processing operations of PCO are the same as those in Embodiment 1.

Chemical equation 6

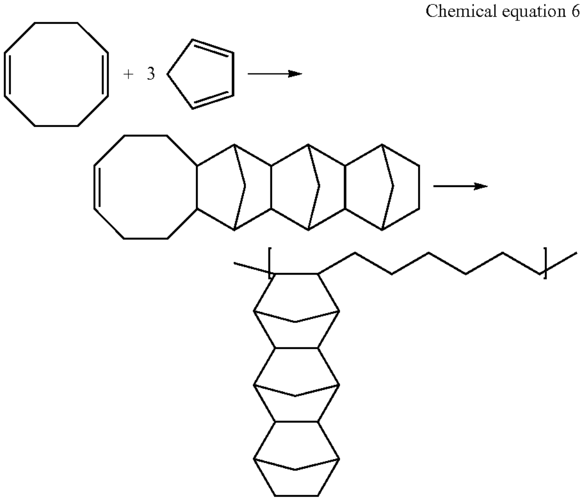

A cyclic olefin polymer obtained in an embodiment of the application is equivalent to a product of alternating copolymerization of dimethanooctahydronaphthalene and three ethylene molecules. A mole percent of dimethanooctahydronaphthalene is 25%. A weight average molecular weight Mw of the cyclic olefin polymer is 48000. A PDI is 1.8. The cyclic olefin polymer has excellent injection molding properties. Herein, Tg is about 130° C. An obtained injection molding part has a low internal stress. In addition, the cyclic olefin polymer has excellent optical properties (a visible light transmittance is greater than 90%, a refractive index is 1.53 to 1.55, an Abbe number is 55, and a haze is less than 0.2%). In addition, the cyclic olefin polymer material further has excellent mechanical properties. A tensile strength is 57 MPa, an elongation at break is 8%, a flexural strength is 88 MPa, and a flexural modulus is 2800 MPa.

Embodiment 4

(1) In a 250 mL round-bottom flask, dicyclopentadiene is dissolved in cyclohexane, and a catalyst (Pd—B/γ-$Al_2O_3$ amorphous blend, 1 wt %) is added. After the air in the reaction system is replaced with nitrogen, hydrogen enters the reaction system, and a hydrogen pressure is maintained at 1.5 MPa. After the reaction system is violently stirred at 110° C. for 4 hours, pure tricyclo $[4.3.0.1^{2,5}]$-dec-7-ene (tricyclo $[4.3.0.1^{2,5}]$-dec-7-ene, TCDE) is obtained through reduced-pressure distillation. This process is shown in a chemical equation 7. Subsequent polymerization, hydrogenation, and post-processing operations of TCDE are the same as those in Embodiment 1.

Chemical equation 7

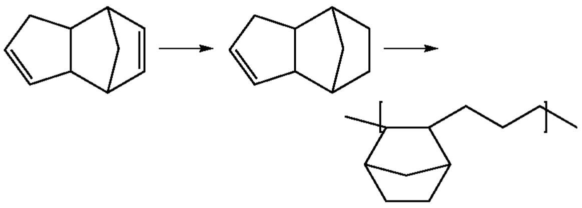

A cyclic olefin polymer obtained in an embodiment of the application is equivalent to a product of alternating copolymerization of norbornene and 1.5 ethylene molecules. A mole percent of norbornene is 40%. A weight average molecular weight Mw of the cyclic olefin polymer is 44000. A PDI is 2.0. The cyclic olefin polymer has excellent injection molding properties. Herein, Tg is about 125° C. An obtained injection molding part has a low internal stress. In addition, the cyclic olefin polymer has excellent optical properties (a visible light transmittance is greater than 90%, a refractive index is 1.53 to 1.55, an Abbe number is 54, and a haze is less than 0.1%). In addition, the cyclic olefin polymer material further has excellent mechanical properties. A tensile strength is 52 MPa, an elongation at break is 12%, a flexural strength is 70 MPa, and a flexural modulus is 2100 MPa.

Embodiment 5

(1) Dicyclopentadiene is put into a flask, reduced-pressure distillation is performed at 210° C., and a fraction is collected to obtain cyclopentadiene. Dicyclopentadiene and cyclopentadiene are put into a flask according to a mole ratio of 1:1.1, heating is performed at 200° C. for 10 hours, and pentacyclo$[6.5.1.1^{3,6}.0^{2,7}.0^{9,13}]$-pentadec-4,10-diene (pentacyclo$[6.5.1.1^{3,6}.0^{2,7}.0^{9,13}]$-pentadec-4,10-diene, PCPD) is obtained through reduced-pressure distillation.

(2) In a 250 mL round-bottom flask, PCPD is dissolved in cyclohexane, and a catalyst (Pd—B/γ-$Al_2O_3$ amorphous blend, 1 wt %) is added. After the air in the reaction system is replaced with nitrogen, hydrogen enters the reaction system, and a hydrogen pressure is maintained at 1.5 MPa. After the reaction system is violently stirred at 110° C. for 4 hours, pure pentacyclo$[6.5.1.1^{3,6}.0^{2,7}.0^{9,13}]$-pentadec-10-ene (pentacyclo$[6.5.1.1^{3,6}.0^{2,7}.0^{9,13}]$-pentadec-10-ene, PCP)

is obtained through reduced-pressure distillation. This process is shown in a chemical equation 8. Subsequent polymerization, hydrogenation, and post-processing processes of PCP are the same as those in Embodiment 1.

Chemical equation 8

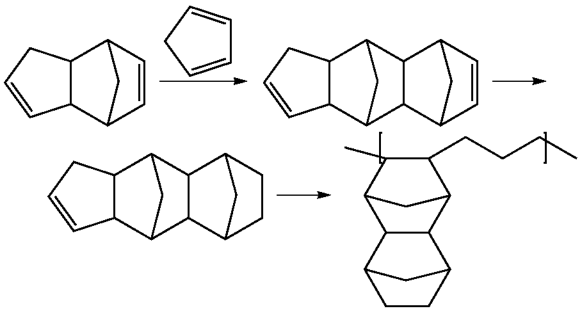

A cyclic olefin polymer obtained in an embodiment of the application is equivalent to a product of alternating copolymerization of dimethanooctahydronaphthalene and 1.5 ethylene molecules. A mole percent of dimethanooctahydronaphthalene is 40%. A weight average molecular weight Mw of the cyclic olefin polymer is 60000. A PDI is 2.4. The cyclic olefin polymer has high Tg. Herein, Tg is about 160° C. In addition, the cyclic olefin polymer has excellent optical properties (a visible light transmittance is greater than 90%, a refractive index is 1.53 to 1.55, an Abbe number is 56, and a haze is less than 0.1%). In addition, the cyclic olefin polymer material further has excellent mechanical properties. A tensile strength is 82 MPa, an elongation at break is 6%, a flexural strength is 137 MPa, and a flexural modulus is 3300 MPa.

Embodiment 6

As shown in a chemical equation 9, TCDE and PCP are put into a 250 mL round-bottom flask according to a ratio (a mole ratio TCDE/PCP is equal to 1/9 to 9/1), toluene is added to dissolve TCDE and PCP, and then Grubbs Catalyst® M102 (0.5 wt %) is added. The air in the flask is replaced with nitrogen, so that the reaction system is in a nitrogen atmosphere. After the reaction proceeds at a room temperature for 2 hours, excessive ethyl vinyl ether is added, and stirring is further performed at the room temperature for 20 minutes. Then, post-processing and hydrogenation processes of the polymer are the same as those in Embodiment 1.

Chemical equation 9

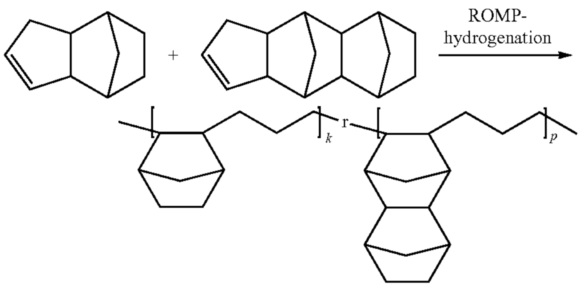

A cyclic olefin polymer obtained in an embodiment of the application is equivalent to a product of alternating copolymerization of dimethanooctahydronaphthalene, norbornene, and 1.5 ethylene molecules. A total mole percent of dimethanooctahydronaphthalene and norbornene is 40%. A weight average molecular weight Mw of the cyclic olefin polymer is 42000 to 65000. A PDI is 1.9 to 2.5. The cyclic olefin polymer material has excellent optical properties (a visible light transmittance is greater than 90%, a refractive index is 1.53 to 1.55, an Abbe number is 54 to 56, and a haze is less than 0.1%). A ratio of two types of cyclic olefin monomers is adjusted. For example, a ratio of k to p is controlled, so that Tg of the polymer can be adjusted within a range of 125° C. to 160° C. In addition, the cyclic olefin polymer material further has excellent mechanical properties. A tensile strength is 52 MPa to 82 MPa, an elongation at break is 6% to 12%, a flexural strength is 70 MPa to 137 MPa, and a flexural modulus is 2100 MPa to 3300 MPa.

For the cyclic olefin polymer obtained in an embodiment of the application, relative content and sequence distribution of a rigid bicyclic structure and a flexible aliphatic group chain segment in the cyclic olefin polymer may be regulated at the same time. When excellent optical properties are obtained, an internal stress of the material is reduced, mechanical properties can be adjusted, and good processability and good molding properties are implemented.

What is claimed is:

1. A cyclic olefin polymer, comprising:

a repeat unit whose structural formula is shown in Formula (1) and a repeat unit whose structural formula is shown in Formula (2):

Formula (1)

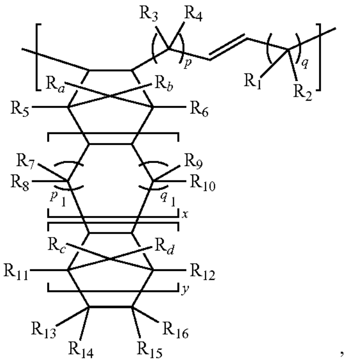

, and

Formula (2)

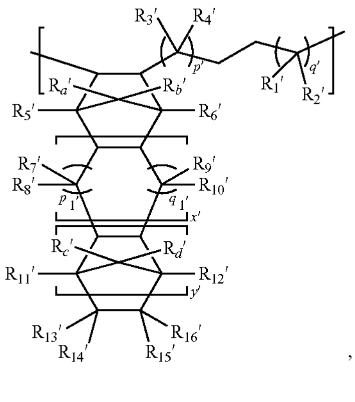

, wherein in Formula (1), p and q are integers greater than or equal to 0 and less than or equal to 6;

x and y are integers greater than or equal to 0; $p_1$ and $q_1$ are integers greater than or equal to 0 and less than or equal to 6, and $p_1$ and $q_1$ are not 0 at the same time; $R_1$ to $R_{12}$, $R_a$, $R_b$, $R_c$, and $R_d$ are separately and independently selected from a hydrogen atom, a halogen atom, an alkyl group, an aryl group, an alkoxy group, a hydroxy group, an ester group, a cyano group, an amino group, a thiol group, and an atom or an atomic group that can replace the foregoing group; and $R_{13}$, $R_{14}$, $R_{15}$, and $R_{16}$ are separately and independently selected from the hydrogen atom, the halogen atom, the alkyl group, the aryl group, the alkoxy group, the hydroxy group, the ester group, the cyano group, the amino group, the thiol group, and the atom or the atomic group that can replace the foregoing group; or any two, three, or four of $R_{13}$, $R_{14}$, $R_{15}$, and $R_{16}$ are connected to form a cyclic structure, and a group that does not participate in forming the cyclic structure in $R_{13}$, $R_{14}$, $R_{15}$, and $R_{16}$ is separately and independently selected from the hydrogen atom, the halogen atom, the alkyl group, the aryl group, the alkoxy group, the hydroxy group, the ester group, the cyano group, the amino group, the thiol group, and the atom or the atomic group that can replace the foregoing group; and in Formula (2), p' and q' are integers greater than or equal to 0 and less than or equal to 6; x' and y' are integers greater than or equal to 0; $p_1$' and $q_1$' are integers greater than or equal to 0 and less than or equal to 6, and $p_1$' and $q_1$' are not 0 at the same time; $R_1$' to $R_{12}$', $R_a$', $R_b$', $R_c$', and $R_d$' are separately and independently selected from the hydrogen atom, the halogen atom, the alkyl group, the aryl group, the alkoxy group, the hydroxy group, the ester group, the cyano group, the amino group, the thiol group, and the atom or the atomic group that can replace the foregoing group; and $R_{13}$', $R_{14}$', $R_{15}$', and $R_{16}$' are separately and independently selected from the hydrogen atom, the halogen atom, the alkyl group, the aryl group, the alkoxy group, the hydroxy group, the ester group, the cyano group, the amino group, the thiol group, and the atom or the atomic group that can replace the foregoing group; or any two, three, or four of $R_{13}$', $R_{14}$', $R_{15}$', and $R_{16}$' are connected to form the cyclic structure, and a group that does not participate in forming the cyclic structure in $R_{13}$', $R_{14}$', $R_{15}$', and $R_{16}$' is separately and independently selected from the hydrogen atom, the halogen atom, the alkyl group, the aryl group, the alkoxy group, the hydroxy group, the ester group, the cyano group, the amino group, the thiol group, and the atom or the atomic group that can replace the foregoing group.

2. The cyclic olefin polymer according to claim 1, wherein in the cyclic olefin polymer, a total mass percent of the repeat unit whose structural formula is shown in Formula (1) and the repeat unit whose structural formula is shown in Formula (2) is greater than or equal to 50%.

3. The cyclic olefin polymer according to claim 1, further comprising:

a repeat unit whose structural formula is shown in Formula (3):

Formula (3)

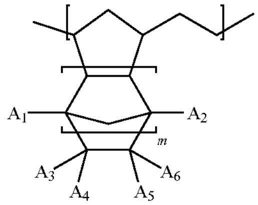

, wherein in Formula (3), m is an integer greater than or equal to 0 and less than or equal to 10, and $A_1$ and $A_2$ are separately and independently selected from a hydrogen atom, a halogen atom, an alkyl group, an aryl group, an alkoxy group, a hydroxy group, an ester group, a cyano group, an amino group, a thiol group, and an atom or an atomic group that can replace the foregoing group; and $A_3$, $A_4$, $A_5$, and $A_6$ are separately and independently selected from the hydrogen atom, the halogen atom, E group, the aryl group, the alkoxy group, the hydroxy group, the ester group, the cyano group, the amino group, the thiol group, and the atom or the atomic group that can replace the foregoing group; or any two, three, or four of $A_3$, $A_4$, $A_5$, and $A_6$ are connected to form a cyclic structure, and a group that does not participate in forming the cyclic structure in $A_3$, $A_4$, $A_5$, and $A_6$ is separately and independently selected from the hydrogen atom, the halogen atom, the alkyl group, the aryl group, the alkoxy group, the hydroxy group, the ester group, the cyano group, the amino group, the thiol group, and the atom or the atomic group that can replace the foregoing group.

4. The cyclic olefin polymer according to claim 3, wherein in the cyclic olefin polymer, a mass percent of the repeat unit whose structural formula is shown in Formula (3) is greater than 0% and less than or equal to 50%.

5. The cyclic olefin polymer according to claim 1, wherein a weight average molecular weight of the cyclic olefin polymer is 10000 to 200000.

6. The cyclic olefin polymer according to claim 1, wherein a refractive index of the cyclic olefin polymer is 1.53 to 1.58.

7. The cyclic olefin polymer according to claim 1, wherein an Abbe number of the cyclic olefin polymer is greater than or equal to 53.

8. The cyclic olefin polymer according to claim 1, wherein a haze of the cyclic olefin polymer is less than 0.2%.

9. The cyclic olefin polymer according to claim 1, wherein a visible light transmittance of the cyclic olefin polymer is greater than or equal to 90%.

10. The cyclic olefin polymer according to claim 1, wherein a glass transition temperature of the cyclic olefin polymer is greater than 100° C.

11. The cyclic olefin polymer according to claim 1, wherein for the cyclic olefin polymer, a tensile strength is greater than or equal to 30 MPa, wherein an elongation at break is greater than or equal to 6%, and wherein a flexural modulus is greater than 2000 MPa.

12. The cyclic olefin polymer according to claim 1, wherein a flexural strength of the cyclic olefin polymer is greater than or equal to 40 MPa.

13. A cyclic olefin polymer monomer, wherein a chemical structural formula of the cyclic olefin polymer monomer is shown in Formula (4):

Formula (4)

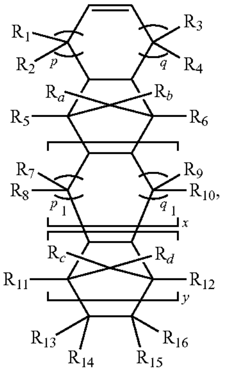

wherein in Formula (4), p and q are integers greater than or equal to 0 and less than or equal to 6; x and y are integers greater than or equal to 0; $p_1$ and $q_1$ are integers greater than or equal to 0 and less than or equal to 6, and $p_1$ and $q_1$ are not 0 at the same time; $R_1$ to $R_{12}$, $R_a$, $R_b$, $R_c$, and $R_d$ are separately and independently selected from a hydrogen atom, a halogen atom, an alkyl group, an aryl group, an alkoxy group, a hydroxy group, an ester group, a cyano group, an amino group, a thiol group, and an atom or an atomic group that can replace the foregoing group; and $R_{13}$, $R_{14}$, $R_{15}$, and $R_{16}$ are separately and independently selected from the hydrogen atom, the halogen atom, the alkyl group, the aryl group, the alkoxy group, the hydroxy group, the ester group, the cyano group, the amino group, the thiol group, and the atom or the atomic group that can replace the foregoing group; or any two, three, or four of $R_{13}$, $R_{14}$, $R_{15}$, and $R_{16}$ are connected to form a cyclic structure, and a group that does not participate in forming the cyclic structure in $R_{13}$, $R_{14}$, $R_{15}$, and $R_{16}$ is separately and independently selected from the hydrogen atom, the halogen atom, the alkyl group, the aryl group, the alkoxy group, the hydroxy group, the ester group, the cyano group, the amino group, the thiol group, and the atom or the atomic group that can replace the foregoing group.

14. An optical material, comprising the cyclic olefin polymer comprising:

a repeat unit whose structural formula is shown in Formula (1) and a repeat unit whose structural formula is shown in Formula (2):

Formula (1)

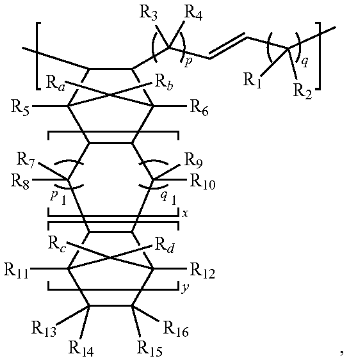

, and

-continued

Formula (2)

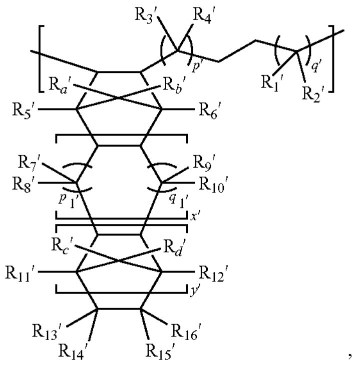

, wherein in Formula (1), p and q are integers greater than or equal to 0 and less than or equal to 6; x and y are integers greater than or equal to 0; p1 and q1 are integers greater than or equal to 0 and less than or equal to 6, and p1 and q1 are not 0 at the same time; R1 to R12, Ra, Rb, Rc, and Rd are separately and independently selected from a hydrogen atom, a halogen atom, an alkyl group, an aryl group, an alkoxy group, a hydroxy group, an ester group, a cyano group, an amino group, a thiol group, and an atom or an atomic group that can replace the foregoing group; and R13, R14, R15, and R16 are separately and independently selected from the hydrogen atom, the halogen atom, the alkyl group, the aryl group, the alkoxy group, the hydroxy group, the ester group, the cyano group, the amino group, the thiol group, and the atom or the atomic group that can replace the foregoing group; or any two, three, or four of R13, R14, R15, and R16 are connected to form a cyclic structure, and a group that does not participate in forming the cyclic structure in R13, R14, R15, and R16 is separately and independently selected from the hydrogen atom, the halogen atom, the alkyl group, the aryl group, the alkoxy group, the hydroxy group, the ester group, the cyano group, the amino group, the thiol group, and the atom or the atomic group that can replace the foregoing group; and in Formula (2), p' and q' are integers greater than or equal to 0 and less than or equal to 6; x' and y' are integers greater than or equal to 0; p1' and q1' are integers greater than or equal to 0 and less than or equal to 6, and p1' and q1' are not 0 at the same time; R1' to R12', Ra', Rb', Rc', and Rd' are separately and independently selected from the hydrogen atom, the halogen atom, the alkyl group, the aryl group, the alkoxy group, the hydroxy group, the ester group, the cyano group, the amino group, the thiol group, and the atom or the atomic group that can replace the foregoing group; and R13', R14', R15', and R16' are separately and independently selected from the hydrogen atom, the halogen atom, the alkyl group, the aryl group, the alkoxy group, the hydroxy group, the ester group, the cyano group, the amino group, the thiol group, and the atom or the atomic group that can replace the foregoing group; or any two, three, or four of R13', R14', R15', and R16' are connected to form the cyclic structure, and a group that does not participate in forming the cyclic structure in R13', R14', R15', and R16' is separately and independently selected from the hydrogen atom, the halogen atom, the alkyl group, the aryl group, the alkoxy group, the hydroxy group, the ester group, the cyano group, the amino group, the thiol group, and the atom or the atomic group that can replace the foregoing group.

15. The optical material according to claim 14, further comprising:

an additive comprising one or more of an antioxidant, a plasticizer, a heat stabilizer, and an anti-aging agent.

16. The optical material according to claim 14, wherein in the optical material, a mass percent of the cyclic olefin polymer is greater than or equal to 60%.

17. An optical product, comprising a cyclic olefin polymer comprising:

a repeat unit whose structural formula is shown in Formula (1) and a repeat unit whose structural formula is shown in Formula (2):

Formula (1)

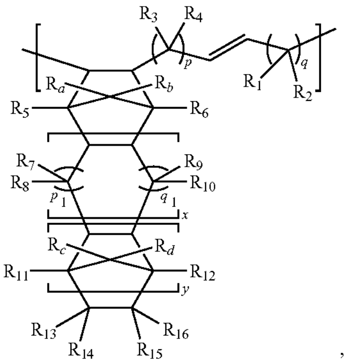

, and

Formula (2)

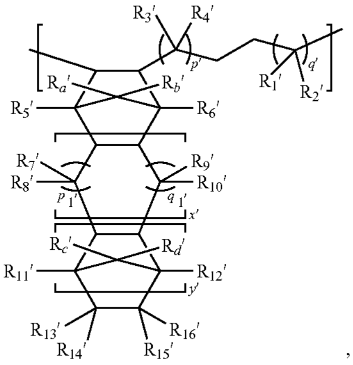

, wherein in Formula (1), p and q are integers greater than or equal to 0 and less than or equal to 6; x and y are integers greater than or equal to 0; $p_1$ and $q_1$ are integers greater than or equal to 0 and less than or equal to 6, and $p_1$ and $q_1$ are not 0 at the same time; $R_1$ to $R_{12}$, $R_a$, $R_b$, $R_c$, and $R_d$ are separately and independently selected from a hydrogen atom, a halogen atom, an alkyl group, an aryl group, an alkoxy group, a hydroxy group, an ester group, a cyano group, an amino group, a thiol group, and an atom or an atomic group that can replace the foregoing group; and $R_{13}$, $R_{14}$, $R_{15}$, and $R_{16}$ are separately and independently selected from the hydrogen atom, the halogen atom, the alkyl group, the aryl group, the alkoxy group, the hydroxy group, the ester group, the cyano group, the amino group, the thiol group, and the atom or the atomic group that can replace the foregoing group; or any two, three, or four of $R_{13}$, $R_{14}$, $R_{15}$, and $R_{16}$ are connected to form a cyclic structure, and a group that does not participate in forming the cyclic structure in $R_{13}$, $R_{14}$, $R_{15}$, and $R_{16}$ is separately and independently selected from the hydrogen atom, the halogen atom, the alkyl group, the aryl group, the alkoxy group, the hydroxy group, the ester group, the cyano group, the amino group, the thiol group, and the atom or the atomic group that can replace the foregoing group; and in Formula (2), p' and q' are integers greater than or equal to 0 and less than or equal to 6; x' and y' are integers greater than or equal to 0; $p_1'$ and $q_1'$ are integers greater than or equal to 0 and less than or equal to 6, and $p_1'$ and $q_1'$ are not 0 at the same time; $R_1'$ to $R_{12}'$, $R_a'$, $R_b'$, $R_c'$, and $R_d'$ are separately and independently selected from the hydrogen atom, the halogen atom, the alkyl group, the aryl group, the alkoxy group, the hydroxy group, the ester group, the cyano group, the amino group, the thiol group, and the atom or the atomic group that can replace the foregoing group; and $R_{13}'$, $R_{14}'$, $R_{15}'$, and $R_{16}'$ are separately and independently selected from the hydrogen atom, the halogen atom, the alkyl group, the aryl group, the alkoxy group, the hydroxy group, the ester group, the cyano group, the amino group, the thiol group, and the atom or the atomic group that can replace the foregoing group; or any two, three, or four of $R_{13}'$, $R_{14}'$, $R_{15}'$, and $R_{16}'$ are connected to form the cyclic structure, and a group that does not participate in forming the cyclic structure in $R_{13}'$, $R_{14}'$, $R_{15}'$, and $R_{16}'$ is separately and independently selected from the hydrogen atom, the halogen atom, the alkyl group, the aryl group, the alkoxy group, the hydroxy group, the ester group, the cyano group, the amino group, the thiol group, and the atom or the atomic group that can replace the foregoing group.

18. The optical product according to claim 17, comprising: an optical lens, an optical film, an optical disc, a light guide plate, or a display panel.

19. The optical product according to claim 18, wherein the optical lens comprises an eyeglass lens, a camera lens, a sensor lens, an illumination lens, and an imaging lens.

20. A device, comprising an optical product comprising a cyclic olefin polymer comprising:

a repeat unit whose structural formula is shown in Formula (1) and a repeat unit whose structural formula is shown in Formula (2):

Formula (1)

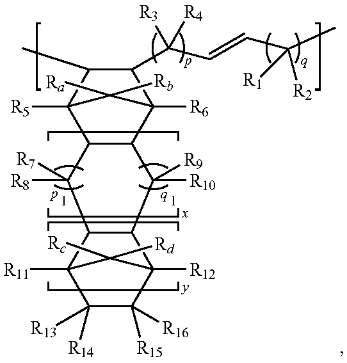

, and

-continued

Formula (2)

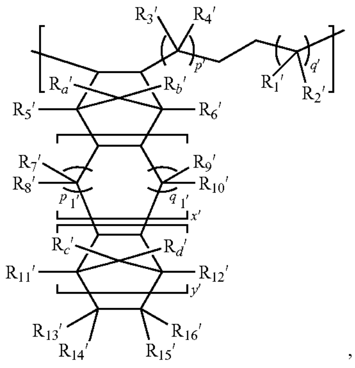

, wherein in Formula (1), p and q are integers greater than or equal to 0 and less than or equal to 6; x and y are integers greater than or equal to 0; $p_1$ and $q_1$ are integers greater than or equal to 0 and less than or equal to 6, and $p_1$ and $q_1$ are not 0 at the same time; $R_1$ to $R_{12}$, $R_a$, $R_b$, $R_c$, and $R_d$ are separately and independently selected from a hydrogen atom, a halogen atom, an alkyl group, an aryl group, an alkoxy group, a hydroxy group, an ester group, a cyano group, an amino group, a thiol group, and an atom or an atomic group that can replace the foregoing group; and $R_{13}$, $R_{14}$, $R_{15}$, and $R_{16}$ are separately and independently selected from the hydrogen atom, the halogen atom, the alkyl group, the aryl group, the alkoxy group, the hydroxy group, the ester group, the cyano group, the amino group, the thiol group, and the atom or the atomic group that can replace the foregoing group; or any two, three, or four of $R_{13}$, $R_{14}$, $R_{15}$, and $R_{16}$ are connected to form a cyclic structure, and a group that does not participate in forming the cyclic structure in $R_{13}$, $R_{14}$, $R_{15}$, and $R_{16}$ is separately and independently selected from the hydrogen atom, the halogen atom, the alkyl group, the aryl group, the alkoxy group, the hydroxy group, the ester group, the cyano group, the amino group, the thiol group, and the atom or the atomic group that can replace the foregoing group; and in Formula (2), p' and q' are integers greater than or equal to 0 and less than or equal to 6; x' and y' are integers greater than or equal to 0; $p_1$' and $q_1$' are integers greater than or equal to 0 and less than or equal to 6, and $p_1$' and $q_1$' are not 0 at the same time; $R_1$' to $R_{12}$', $R_a$', $R_b$', $R_c$', and $R_d$' are separately and independently selected from the hydrogen atom, the halogen atom, the alkyl group, the aryl group, the alkoxy group, the hydroxy group, the ester group, the cyano group, the amino group, the thiol group, and the atom or the atomic group that can replace the foregoing group; and $R_{13}$', $R_{14}$', $R_{15}$', and $R_{16}$' are separately and independently selected from the hydrogen atom, the halogen atom, the alkyl group, the aryl group, the alkoxy group, the hydroxy group, the ester group, the cyano group, the amino group, the thiol group, and the atom or the atomic group that can replace the foregoing group; or any two, three, or four of $R_{13}$', $R_{14}$', $R_{15}$', and $R_{16}$' are connected to form the cyclic structure, and a group that does not participate in forming the cyclic structure in $R_{13}$', $R_{14}$', $R_{15}$', and $R_{16}$' is separately and independently selected from the hydrogen atom, the halogen atom, the alkyl group, the aryl group, the alkoxy group, the hydroxy group, the ester group, the cyano group, the amino group, the thiol group, and the atom or the atomic group that can replace the foregoing group.

* * * * *